(12) United States Patent
Satterfield et al.

(10) Patent No.: US 12,344,381 B2
(45) Date of Patent: Jul. 1, 2025

(54) TRAY TABLE WITH MAGNETIC DETENT AND/OR INTERLOCK

(71) Applicant: S & S Numerical Control, Inc., Northridge, CA (US)

(72) Inventors: Johnny A. Satterfield, Chatsworth, CA (US); Dane Sandifer, Northridge, CA (US)

(73) Assignee: S & S Numerical Control, Inc., Northridge, CA (US)

( * ) Notice: Subject to any disclaimer, the term of this patent is extended or adjusted under 35 U.S.C. 154(b) by 203 days.

(21) Appl. No.: 18/098,461

(22) Filed: Jan. 18, 2023

(65) Prior Publication Data

US 2023/0227163 A1    Jul. 20, 2023

Related U.S. Application Data

(60) Provisional application No. 63/300,772, filed on Jan. 19, 2022, provisional application No. 63/300,763, filed on Jan. 19, 2022.

(51) Int. Cl.
*B64D 11/06* (2006.01)

(52) U.S. Cl.
CPC .............................. *B64D 11/0638* (2014.12)

(58) Field of Classification Search
CPC .... B64D 11/0638; A47B 83/0215; A47B 1/10
USPC ....................................................... 297/146
See application file for complete search history.

(56) References Cited

U.S. PATENT DOCUMENTS

| | | | | |
|---|---|---|---|---|
| 5,092,652 A | * | 3/1992 | Macaluso | A47B 13/16 108/26 |
| 5,370,060 A | * | 12/1994 | Wang | B60N 3/004 297/163 |
| 6,244,192 B1 | * | 6/2001 | Suzuki | B23Q 1/621 108/20 |
| 8,132,874 B2 | * | 3/2012 | Ong | H05K 7/1489 312/334.4 |
| 11,633,040 B2 | * | 4/2023 | Beasley | A47B 31/00 108/25 |
| 2009/0188881 A1 | * | 7/2009 | Travis | B62B 9/26 211/132.1 |
| 2010/0282932 A1 | * | 11/2010 | Ong | H05K 7/1489 211/183 |
| 2015/0061327 A1 | * | 3/2015 | Millan | B60N 3/004 297/163 |
| 2015/0321592 A1 | * | 11/2015 | De Morais | B64D 11/0638 297/135 |
| 2017/0238696 A1 | * | 8/2017 | Ehrreich | A47B 9/20 |
| 2017/0283067 A1 | * | 10/2017 | Darbyshire | B64D 11/0638 |
| 2018/0244183 A1 | * | 8/2018 | Ruiz | F16M 11/38 |
| 2021/0070445 A1 | * | 3/2021 | Rossini | B64D 43/00 |
| 2021/0282545 A1 | * | 9/2021 | Bugg | A47B 13/081 |

(Continued)

*Primary Examiner* — Jose V Chen

(74) *Attorney, Agent, or Firm* — Matthew J. Spark; Stefan J. Kirchanski; Zuber Lawler LLP

(57) ABSTRACT

A telescopic rail system includes rails slidably interconnected with each other such that the rails slide relative to each other along a longitudinal axis. The rails are configured to be operatively connected to a carriage such that the rails guide movement of the carriage between an extended position and a retracted position. The rails include first and second magnetic detents configured to releasably hold the carriage in a partially-extended position and the extended position, respectively.

20 Claims, 20 Drawing Sheets

(56) References Cited

U.S. PATENT DOCUMENTS

| | | | |
|---|---|---|---|
| 2023/0147736 A1* | 5/2023 | Jiang | A47B 3/087 |
| | | | 108/86 |
| 2023/0187015 A1* | 6/2023 | Gates | B60N 3/004 |
| | | | 116/307 |
| 2023/0227162 A1* | 7/2023 | Satterfield | B64D 11/0638 |
| | | | 108/44 |
| 2024/0199214 A1* | 6/2024 | Pence | B64D 11/0605 |

* cited by examiner

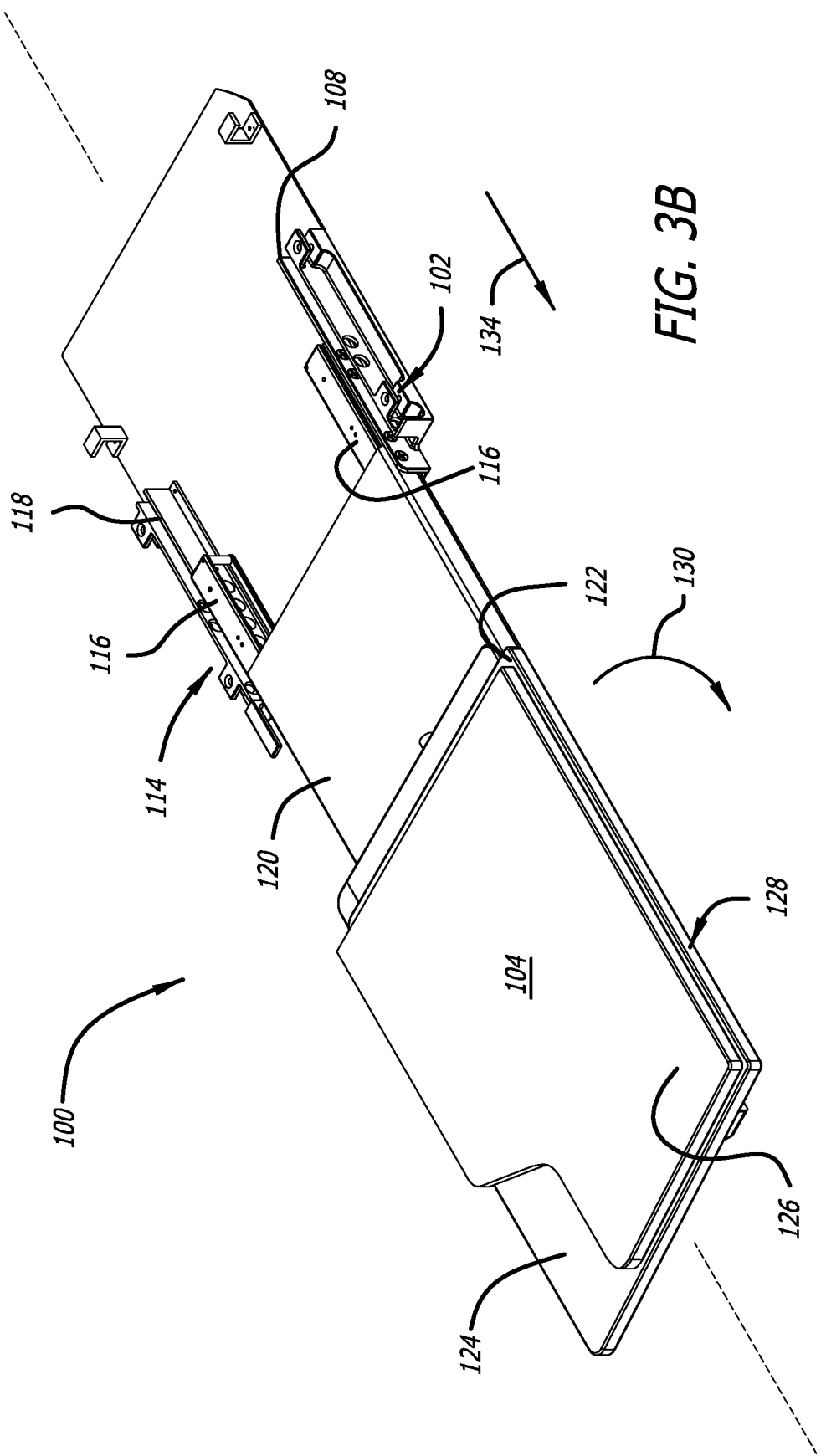

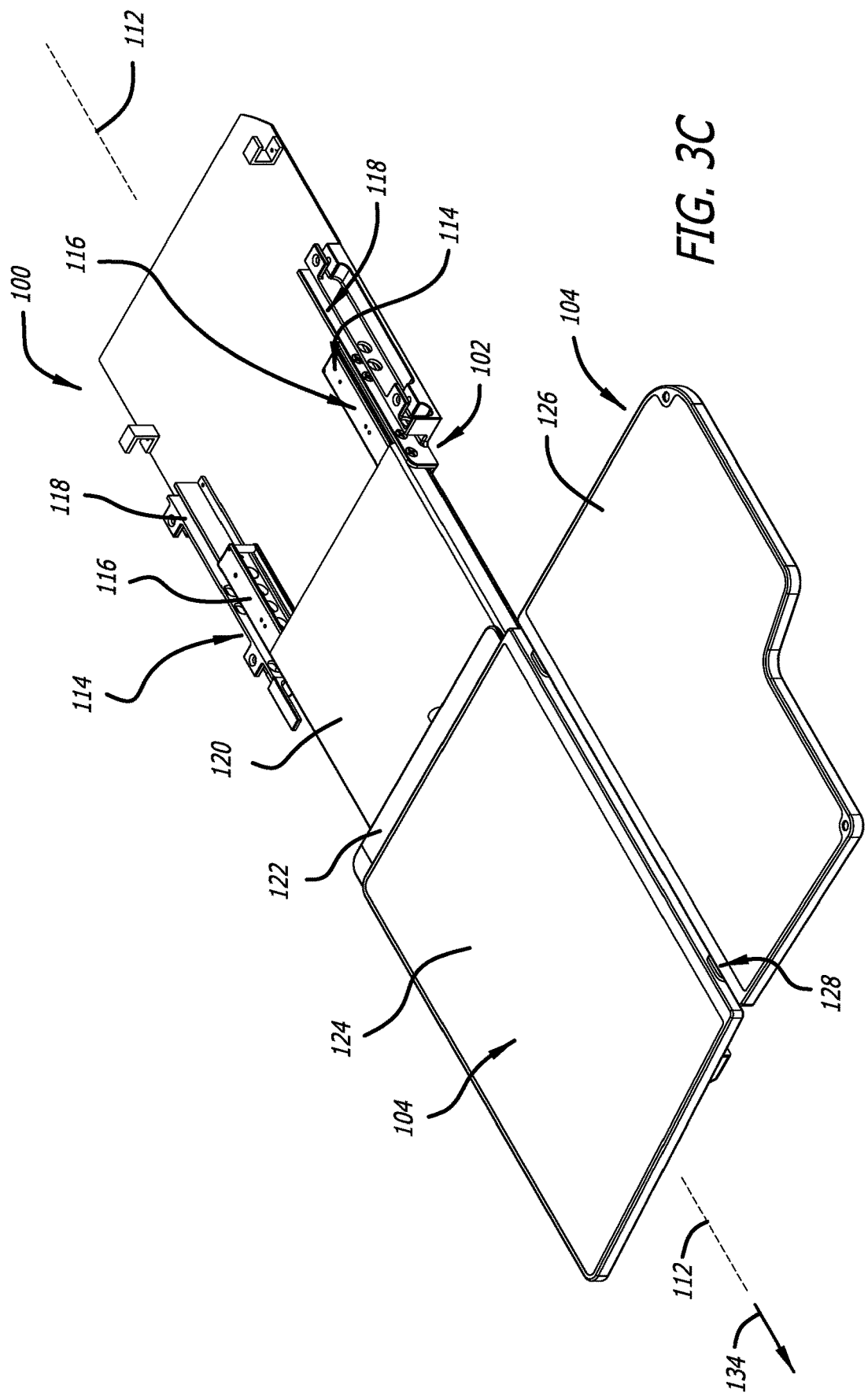

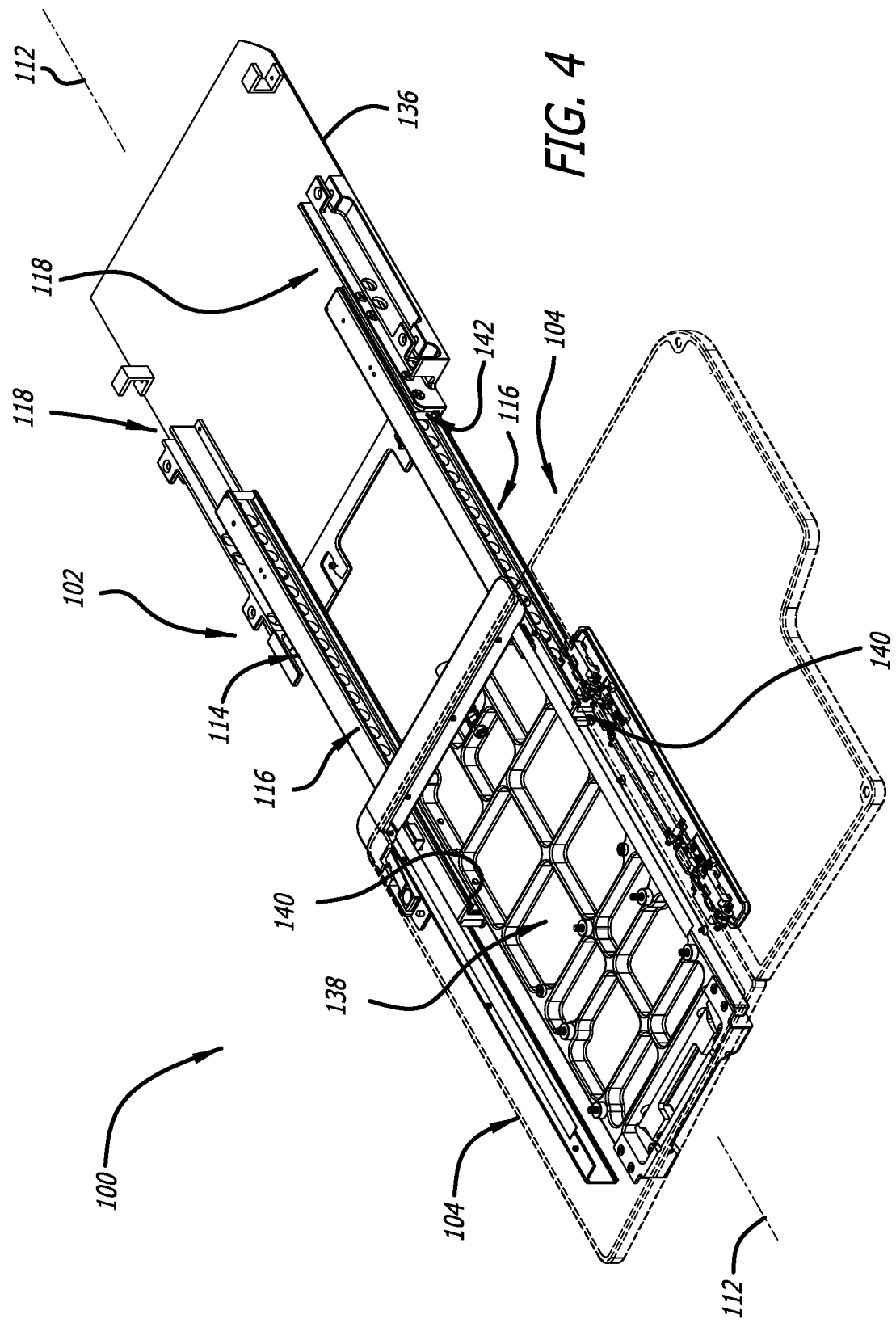

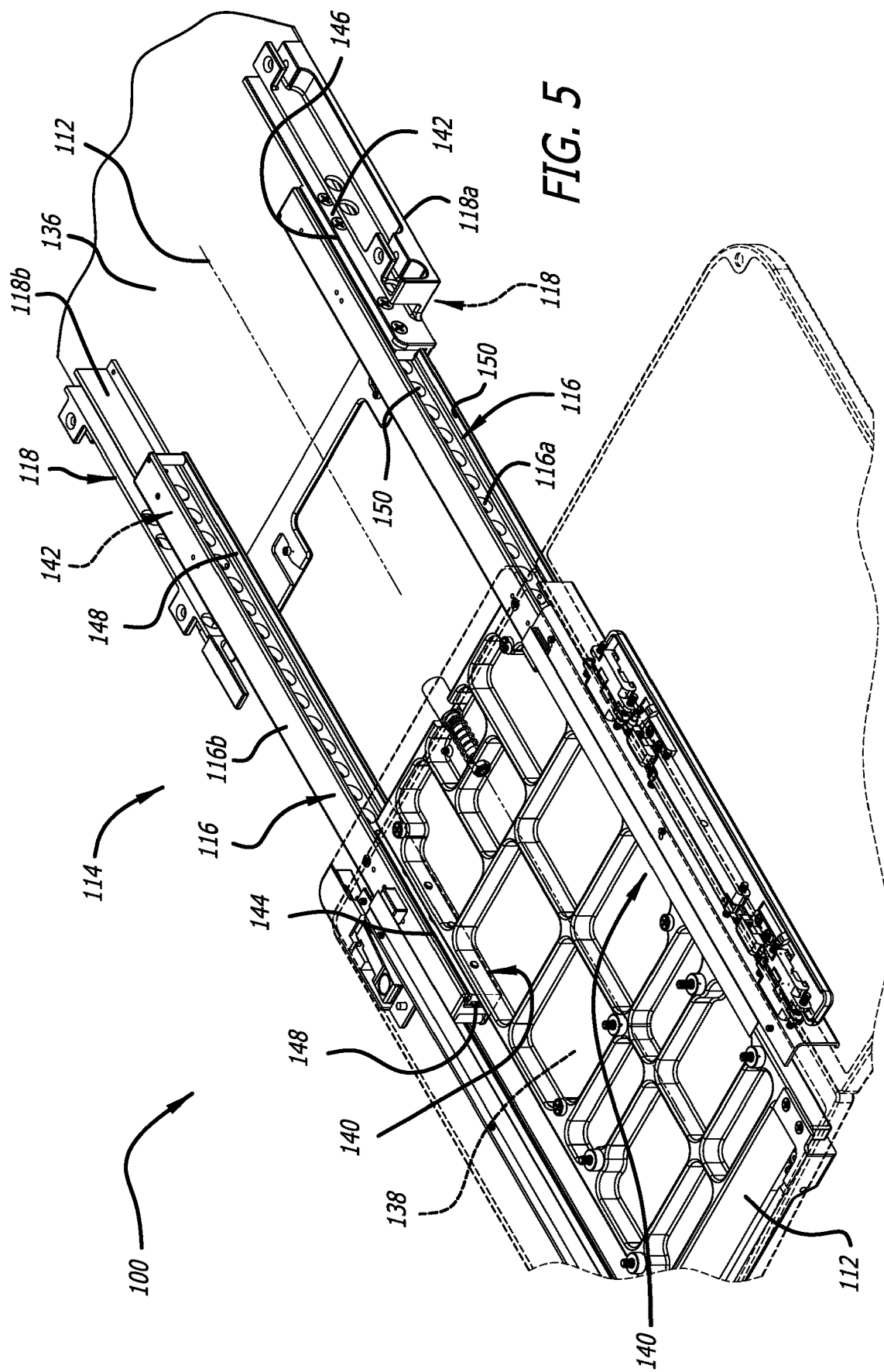

TRAY TABLE WITH MAGNETIC DETENT AND/OR INTERLOCK

CROSS-REFERENCE TO PRIOR APPLICATIONS

The instant application claims the benefit of U.S. Provisional Patent Application No. 63/300,763, filed on Jan. 19, 2022, and of U.S. Provisional Patent Application No. 63/300,772, filed on Jan. 19, 2022, which are each incorporated herein by reference in its entirety.

FIELD OF THE INVENTION

The present invention relates generally to tables. More particularly, the present invention relates to mechanism for deploying a table associated with an aircraft passenger seat.

BACKGROUND

Commercial airline companies strive to provide improved services for their customers as well as improving passenger comfort and convenience. It is common for passengers on both private and commercial aircraft to have use of tables built into the seatback of a passenger seat directly in front of them or tables deployable from within a seat console to one side of the passenger where the table surface must be unfolded to provide sufficient surface area for placement of food, drink or other objects thereupon.

Different types of tables associated with aircraft passenger seats have been proposed that can be moved between stowed and deployed positions. However, such tables have their limitations and can always be improved.

Slide-out tray tables for aircraft include telescoping bases that enable the tray table to be extended outward from a stowed position toward an extended position. A table leaf of the tray table can be moved (e.g., rotated, unfolded, etc.) to a deployed position of the table leaf for use thereof. However, it may be difficult for some users to know whether the tray table or table leaf has moved into a desired position thereof, which may increase the difficulty of using the tray table. Moreover, some users may mishandle the tray table during movement of the base and/or the table leaf between the various positions thereof, which may prematurely wear and/or damage the base, the table leaf, and/or other components of the tray table.

Accordingly, there is a need for an improved table moveable between stowed and deployed positions. There is also a need for table that can be stowed within a seat console. There is an additional need for a table that is easier to manufacture, assemble, adjust, and maintain. The present invention satisfies these needs and provides other related advantages.

SUMMARY

The present invention provides mechanisms for an improved tray table movable between stowed and deployed positions. The present invention also provides mechanisms for a deployable tray table that can be stowed within a seat, seat console, bulkhead, wall, or the like of an aircraft. The present invention provides mechanisms for a deployable tray table that is easier to manufacture, assemble, adjust, and maintain. The present invention satisfies these needs and provides other related advantages.

In one aspect, a telescopic rail system for a tray table of an aircraft includes rails and rail mounts slidably interconnected with each other such that the rails and rail mounts slide relative to each other along a longitudinal axis. A single rail and a single rail mount engaging each other may in some instances be collectively be referred to as a "rail". The rails and rail mounts are configured to be operatively connected to the carriage such that the rails guide movement of the carriage between an extended position and a retracted position of the tray table. The rails and rails mounts include first and second magnetic detents configured to releasably hold the carriage in a partially-extended position of the tray table and the extended position of the tray table, respectively.

In another aspect, a slide-out tray table of an aircraft includes a carriage configured to hold a table leaf of the tray table and a telescopic rail system configured to expand outwardly and retract inwardly along a longitudinal axis. The rail system is operatively connected to the carriage such that the rail system guides movement of the carriage between an extended position and a retracted position of the tray table. The rail system includes a first magnetic detent configured to releasably hold the carriage in a partially-extended position of the tray table. The rail system includes a second magnetic detent configured to releasably hold the carriage in the extended position of the tray table.

In another aspect, a method of configuring a tray table for an aircraft includes operatively connecting a carriage of the tray table to a rail system of the tray table such that the rail system guides movement of the carriage between an extended position and a retracted position of the tray table. The method includes providing the rail system with first and second magnetic detents such that the rail system is configured to releasably hold the carriage in a partially-extended position of the tray table and the extended position of the tray table, respectively.

In another aspect, an interlock assembly for a tray table of an aircraft includes an interlock moveable between an unlocked position and a locked position. The interlock is configured to be held by the tray table such that the interlock is biased to the locked position by gravity. The interlock includes a magnetic component that cooperates with another magnetic component of a table leaf of the tray table such that a repulsive force between the magnetic components holds the interlock in the unlocked position when the table leaf is in a stowed position of the table leaf. The interlock is configured such that the interlock is moved from the unlocked position to the locked position by gravity when the table leaf moves from the stowed position toward a deployed position of the table leaf.

In another aspect, a slide-out tray table for an aircraft includes a telescoping base configured to expand outwardly and retract inwardly between an extended position and a retracted position of the tray table. The tray table includes a table leaf mounted to the base such that the table leaf moves along with the base between the extended and retracted positions of the tray table. The table leaf is selectively moveable between a stowed position and a deployed position. The table leaf includes a first magnetic component. The tray table includes an interlock assembly that includes an interlock moveable between an unlocked position and a locked position. The interlock is held by the base such that the interlock is biased to the locked position by gravity. The interlock includes a second magnetic component that cooperates with the first magnetic component of the table leaf such that a repulsive force between the first and second magnetic components holds the interlock in the unlocked position when the table leaf is in the stowed position.

In another aspect, a method of configuring a tray table for an aircraft includes mounting an interlock to a base of the tray table such that the interlock is moveable between an unlocked position and a locked position of the interlock and such that the interlock is biased to the locked position by gravity. The method includes providing the interlock with a magnetic component that is configured to cooperate with another magnetic component of a table leaf of the tray table such that a repulsive force between the magnetic components holds the interlock in the unlocked position when the table leaf is in a stowed position of the table leaf.

In another aspect, an interlock assembly for a tray table of an aircraft includes an interlock moveable between an unlocked position and a locked position. The interlock is configured to be held by the tray table such that the interlock is biased to the locked position by gravity. The interlock includes a magnetic component that cooperates with another magnetic component of a table leaf of the tray table such that the magnetic components hold the interlock in the unlocked position when the table leaf is in a stowed position of the table leaf. The interlock is configured such that the interlock is moved from the unlocked position to the locked position by gravity when the table leaf moves from the stowed position toward a deployed position of the table leaf.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The various present embodiments now will be discussed in detail with an emphasis on highlighting the advantageous features with reference to the drawings of various embodiments. The illustrated embodiments are intended to illustrate, but not to limit the invention. These drawings include the following figures, in which like numerals indicate like parts:

FIGS. 3A-3D illustrate isometric views illustrating the tray table shown in FIGS. 1 and 2 according to an implementation;

FIG. 4 illustrates an isometric view of a portion of the tray table shown in FIGS. 1 and 2 according to an implementation;

FIG. 5 illustrates an enlarged isometric view of a portion of the tray table shown in FIG. 4 according to an implementation;

DETAILED DESCRIPTION

Figure 1:
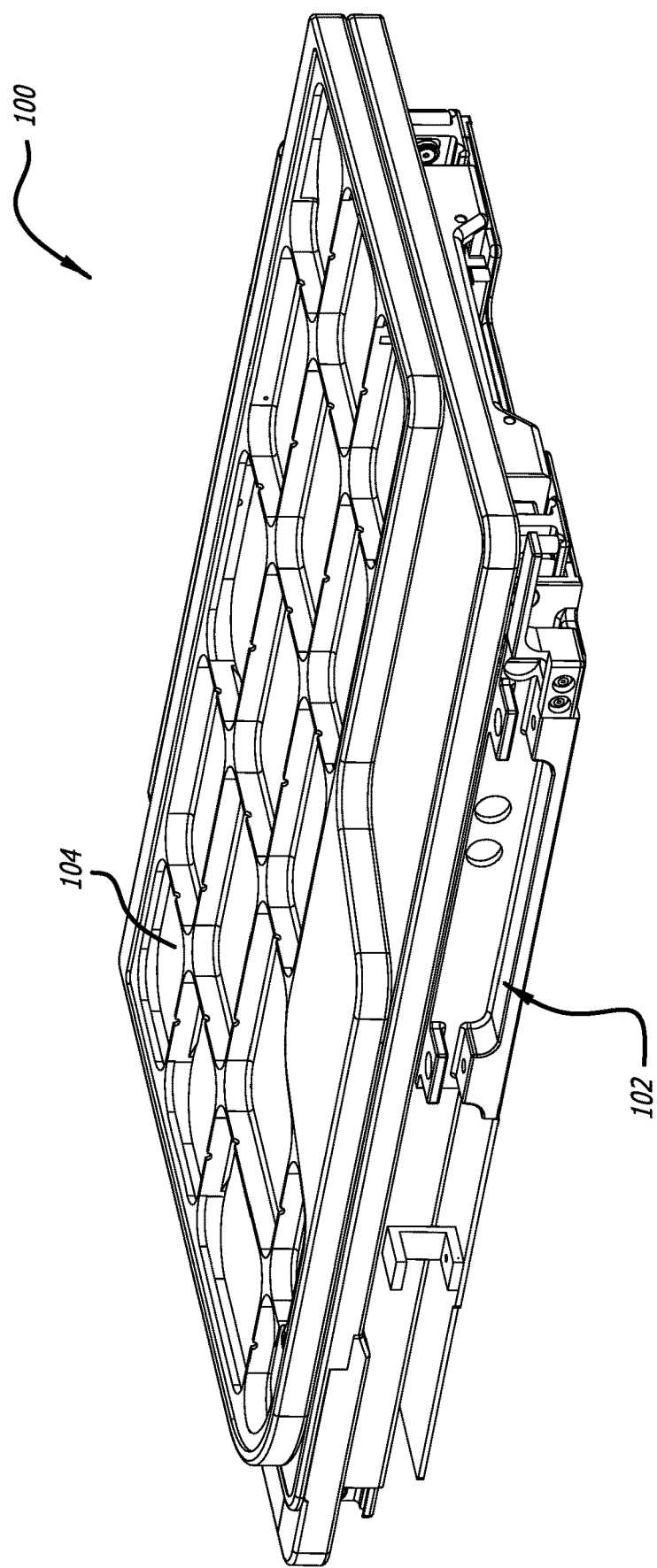
FIG. 1 illustrates an isometric view illustrating a tray table for an aircraft according to an implementation.

The following detailed description describes the present embodiments, with reference to the accompanying drawings. In the drawings, reference numbers label elements of the present embodiments. These reference numbers are reproduced below in connection with the discussion of the corresponding drawing features.

It is to be understood that the figures and descriptions of the present invention have been simplified to illustrate elements that are relevant for a clear understanding of the present invention, while eliminating, for the purpose of clarity, many other elements found in rear derailleurs. Those of ordinary skill in the pertinent arts may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the pertinent arts.

The foregoing summary, as well as the following detailed description of certain embodiments and implementations will be better understood when read in conjunction with the appended drawings. As used herein, an element or step recited in the singular and preceded by the word "a" or "an" should be understood as not necessarily excluding the plural of the elements or steps. Further, references to "one embodiment" or "one implementation" are not intended to be interpreted as excluding the existence of additional embodiments or implementations that also incorporate the recited features. Moreover, unless explicitly stated to the contrary, embodiments "comprising" or "having" an element or a plurality of elements having a particular property can include additional elements not having that property.

While various spatial and directional terms, such as "top," "bottom," "upper," "lower," "vertical," and the like are used to describe embodiments and implementations of the present application, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90°, and the like.

Slide-out tray tables for aircraft include telescoping bases that enable the tray table to be extended outward from a stowed position toward an extended position. A table leaf of the tray table can be moved (e.g., rotated, unfolded, etc.) to a deployed position of the table leaf for use thereof. However, it may be difficult for some users to know whether the tray table or table leaf has moved into a desired position thereof, which may increase the difficulty of using the tray table. Moreover, some users may mishandle the tray table during movement of the base and/or the table leaf between the various positions thereof, which may prematurely wear and/or damage the base, the table leaf, and/or other components of the tray table.

Certain implementations provide a telescopic rail system for a tray table of an aircraft. The rail system includes rails and rail mounts slidably interconnected with each other such that the rails slide relative to each other along a longitudinal axis. The rails are configured to be operatively connected to the carriage such that the rails guide movement of the carriage between an extended position and a retracted position of the tray table. The rails include first and second magnetic detents configured to releasably hold the carriage in a partially-extended position of the tray table and the extended position of the tray table, respectively.

In some implementations, an interlock assembly is provided for a tray table of an aircraft. The interlock assembly includes an interlock moveable between an unlocked position and a locked position. The interlock is configured to be held by the tray table such that the interlock is biased to the locked position by gravity. The interlock includes a magnetic component that cooperates with another magnetic component of a table leaf of the tray table such that a repulsive force between the magnetic components holds the interlock in the unlocked position when the table leaf is in a stowed position of the table leaf. The interlock is configured such that the interlock is moved from the unlocked position to the locked position by gravity when the table leaf moves from the stowed position toward a deployed position of the table leaf.

Certain implementations provide rail systems that operate in an unconventional manner to releasably hold a tray table in a partially-extended position of the tray table. Certain implementations provide rail systems that operate in an unconventional manner to releasably hold a tray table in an extended position of the tray table. Certain implementations provide interlock assemblies that operate in an unconventional manner to limit movement of a tray table toward a stowed position of the tray table when a table leaf of the tray table is in a deployed position.

One or more tray tables of various implementations have an improved user experience, for example as compared to at least some known tray tables. For example, certain implementations provide tray tables that are more intuitive to use, for example as compared to at least some known tray tables. Certain implementations, for example, provide a satisfying feel (e.g., a feeling of quality, etc.) of the movement of the tray table into a partially-extended position. Moreover, and for example, certain implementations provide a satisfying feel of the movement of the tray table into an extended position of the tray table. Further, and for example, the feel of movement of the tray table into the partially-extended position and the feel of movement of the tray table into the extended position provided by at least some implementations disclosed herein provides an indication to the user that the tray table has moved into the desired position (e.g., the partially-extended position, the extended position, etc.). Accordingly, certain implementations disclosed herein reduce the difficulty of using the tray table. Moreover, and for example, certain implementations provide a rail system that is quieter to operate, for example as compared to at least some known rail systems.

At least some implementations of the tray table prevent, or reduce the likelihood of, damage to and/or wearing of the tray table, for example caused by mishandling of the tray table, etc. As such, maintenance costs, for example as compared to at least some known tray tables, are reduced. For example, by providing an indication that the tray table has moved into the extended position, implementations of the rail systems disclosed herein prevent, or reduce the likelihood of, the user attempting to pull the tray table past the extended position. Moreover, and for example, by restricting movement of the tray table toward the stowed position of the tray table when the table leaf is in the deployed position, implementations of the interlock assemblies disclosed herein prevent, or reduce the likelihood of, damage to the tray table and/or adjacent structures of the aircraft caused by collision of the table leaf with adjacent structures of the aircraft when the table leaf is in the deployed position.

Figure 2:
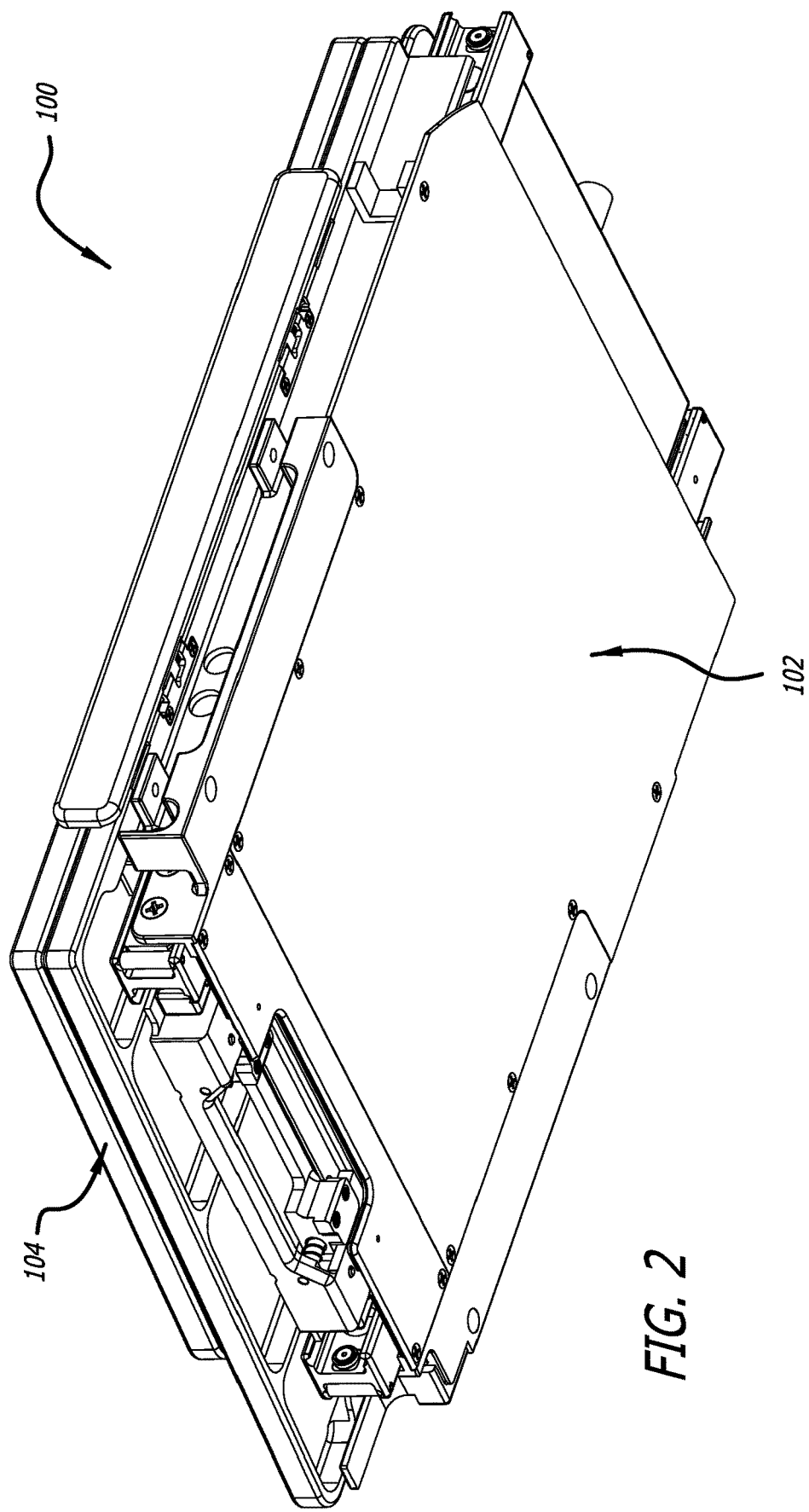
FIG. 2 illustrates another isometric view illustrating the tray table shown in FIG. 1 according to an implementation.
Figure 10:
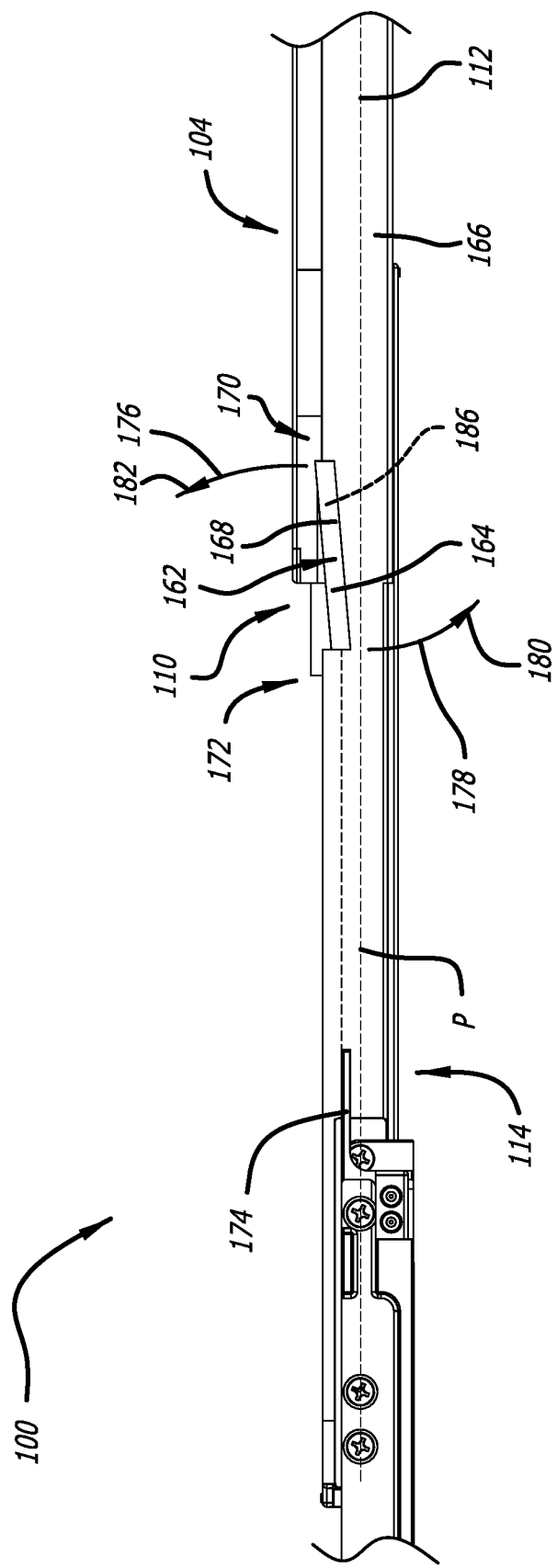
FIG. 10 illustrates an isometric view of the tray table shown in FIGS. 1 and 2 illustrating the interlock assembly in a locked position according to an implementation.

With references now to the figures, perspective views of a tray table 100 for an aircraft (e.g., the aircraft 400 shown in FIG. 13, etc.) are provided in FIGS. 1 and 2. The tray table 100 includes a telescoping base 102, a table leaf 104 mounted to the base 102, one or more magnetic detents 106 and/or 108, and an interlock assembly 110. FIGS. 1 and 2 illustrate the tray table 100 in a stowed position thereof. The stowed position of the tray table 100 may also be referred to herein as a "retracted position" of the tray table 100. In FIGS. 1 and 2, the table leaf 104 is shown in a stowed position of the table leaf 104. The table leaf 104 is moveable from the stowed position to a deployed position of the table leaf 104 that is shown in FIGS. 3C, 3D, and 10. The tray table 100 may be configured to be mounted within the passenger compartment of an aircraft adjacent (e.g., in front of, alongside, on the back of, etc.) a seat, for example.

While the magnetic detents 106 and 108 are not visible and only a portion (e.g., a stop 174) of the interlock assembly 110 is visible in FIGS. 1 and 2, the magnetic detents 106 and 108 and the interlock assembly 110 will be described in more detail below with respect to FIGS. 4-7 and 8-10, respectively. For example, the magnetic detents 106 and 108 are configured to releasably hold the tray table 100 in a partially-extended position and an extended position, respectively, of the tray table 100. Moreover, and for example, the interlock assembly 110 is configured to limit movement of the tray table 100 toward the stowed position of the tray table 100 (e.g., past the partially-extended position of the tray table 100, past an egress position of the tray table 100, etc.) when the table leaf 104 is in the deployed position of the table leaf 104.

Figure 3A:
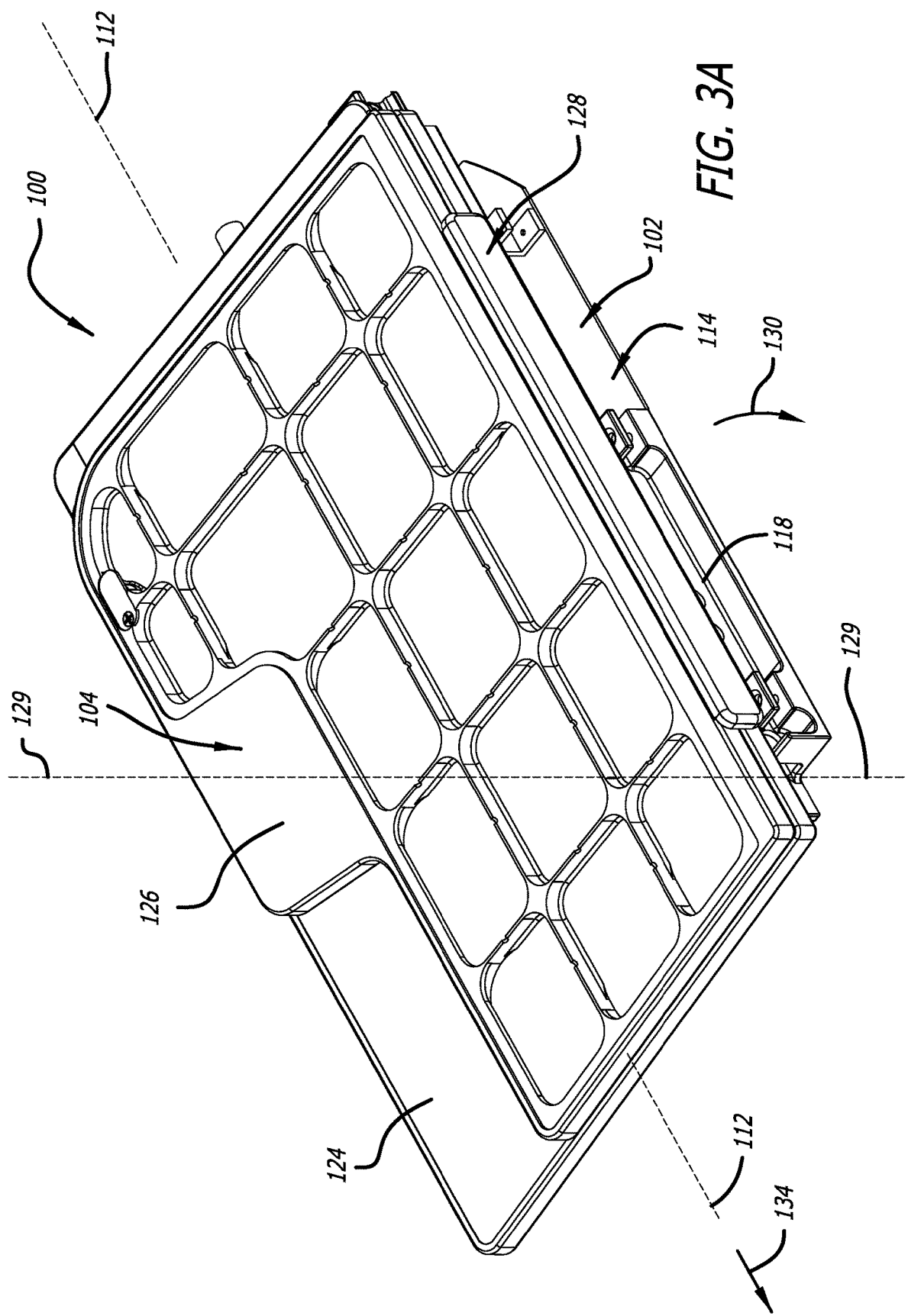
Figure 3D:
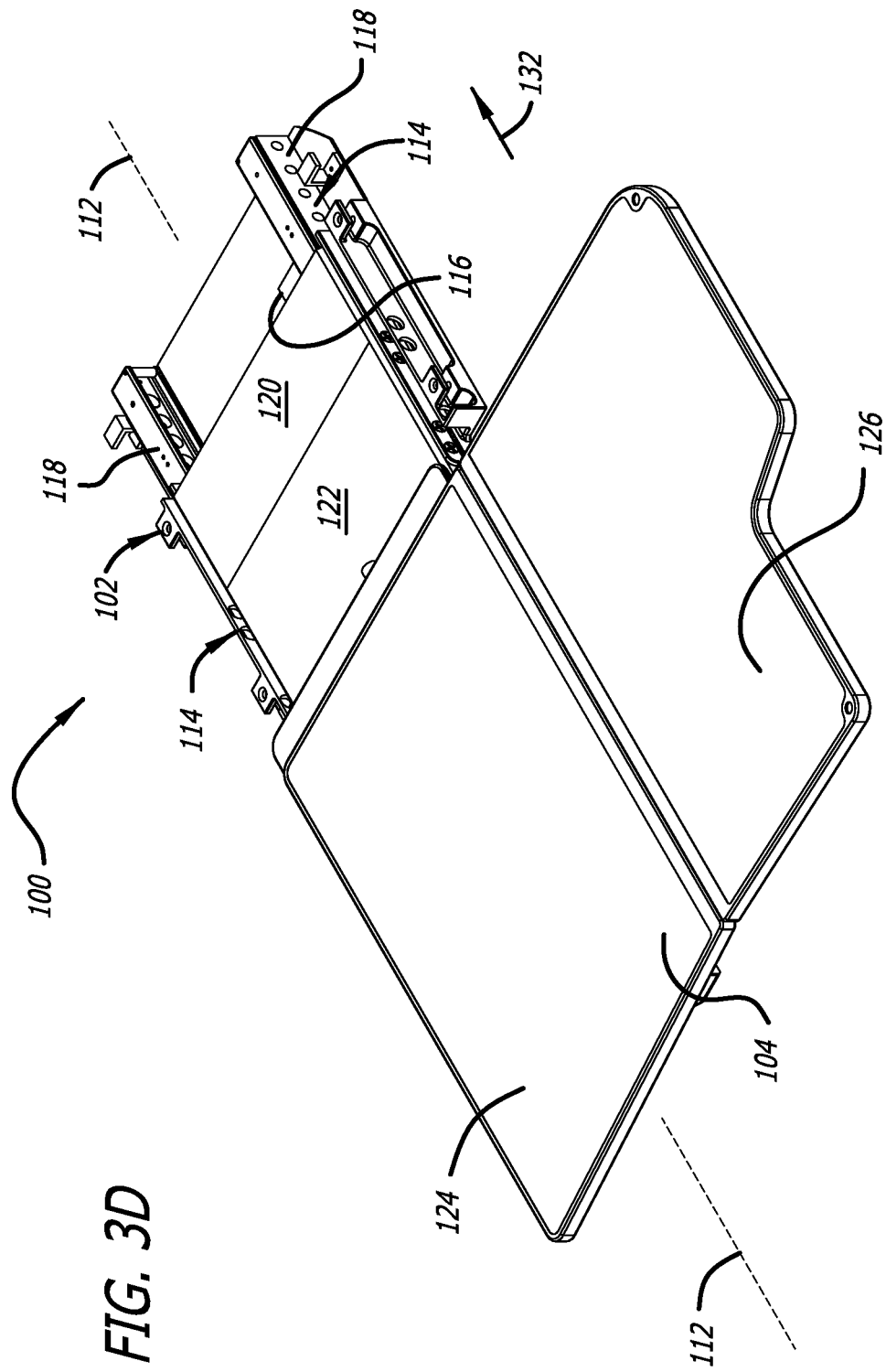

Referring now to FIG. 3, the tray table 100 is moveable between the stowed position and a deployed position of the tray table 100. FIG. 3A illustrates the tray table 100 in the stowed position, while FIG. 3C illustrates the tray table 100 in the deployed position. To move the tray table 100 to the deployed position (e.g., deploy the tray table 100 for use, etc.), the tray table 100 is moveable from the stowed position to an extended position of the tray table 100, which is shown in FIG. 3B. For example, the base 102 of the tray table 100 is configured to telescope inwardly and outwardly along a longitudinal axis 112 to move the tray table 100 between the stowed position of the tray table 100 shown in FIG. 3A and the extended position of the tray table 100 shown in FIG. 3B. Specifically, the base 102 is configured to expand outwardly and retract inwardly along the longitudinal axis 112 between an extended position of the base 102 shown in FIG. 3B and a retracted position of the base 102 shown in FIG. 3A. The retracted position of the base 102 corresponds to the stowed position of the tray table 100 (i.e., the base 102 is moved into the retracted position of the base 102 to move the tray table 100 into the stowed position of the tray table 100). The extended position of the base 102 corresponds to the extended position of the tray table 100 (i.e., the base 102 is moved into the extended position of the base 102 to thereby move the tray table 100 into the extended position of the tray table 100). In other words, the base 102 of the tray table 100 is configured to expand outwardly and retract inwardly along the longitudinal axis 112 between the extended position of the tray table 100 and the stowed position of the tray table 100.

For example, the base 102 of the tray table 100 includes a telescopic rail system 114 having rails 116 and rail mounts 118 (The rail 116 is not visible in FIG. 3A). The rails 116 and 118 are slidably interconnected with each other such that the rails 116 and 118 are configured to slide relative to each other along the longitudinal axis 112 to thereby expand and contract the base 102 along the longitudinal axis 112. In some instances, a single rail 116 and a single rail mount 118 engaged to each other may be collectively referred to as a "rail". In some instances, there may be two rails 116 and two rail mounts 118 (where each single rail 116 engages a single rail mount 118) collectively referred to as "rails". FIGS. 3B, 3C, and 3D illustrate optional covers 120 and 122. The base 102 is not limited to the exemplary rail system 114 shown and described herein. Rather, in addition or alternatively to the rail system 114, the base 102 may include any other structure, system, mechanism, device, and/or the like that enables the base 102 to expand and contract along the longitudinal axis 112 and thereby move the tray table 100 between the stowed and extended positions. Although the rails 116 and rail mounts 118 are shown as being arranged in sets of two (i.e., the rail 116 includes a rail set of two rails 116a and 116b and the rail mounts 118 includes a rail mount set of two rail mounts 118a and 118b, each rail 116 may include any other number of rails (e.g., a single rail, a set of three rails, etc.), and each rail mount 118 may include any other number of rail mounts (e.g., a single rail mount, a set of three rail mounts, etc.).

The table leaf 104 of the tray table 100 is selectively moveable relative to the base 102 between the stowed position of the table leaf 104 and the deployed position of the table leaf 104. As shown in FIG. 3A, the table leaf 104 is in the stowed position thereof when the tray table 100 is in the stowed position thereof. To further deploy the tray table 100 from the extended position of the tray table 100 shown in FIG. 3B to the deployed position of the tray table 100 shown in FIG. 3C, the table leaf 104 is moved relative to the base 102 from the stowed position thereof shown in FIG. 3B into the deployed position of the table leaf 104 shown in FIG. 3C. In some implementations, the tray table 100 is configured such that the table leaf 104 extends over the lap of an occupant of the corresponding seat when the tray table 100 is in the deployed position thereof.

In the illustrated implementation, the table leaf 104 is configured to move from the stowed position to the deployed position by unfolding; and the table leaf 104 is configured to move from the deployed position to the stowed position by folding. For example, the exemplary implementation of the table leaf 104 includes panels 124 and 126 that are connected together at a hinge 128 such that the panel 126 is configured to rotate relative to the panel 124 about the hinge 128. Accordingly, to move the table leaf 104 from the stowed position to the deployed position, the panel 126 is rotated about the hinge 128 relative to the panel 124 to thereby unfold the panel 126 (e.g., approximately 180°, etc.) from the stowed (i.e., folded) position shown in FIGS. 3A and 3B to the deployed (i.e., unfolded) position shown in FIGS. 3C and 3D. To move the table leaf 104 from the deployed position to the stowed position, the panel 126 is rotated about the hinge 128 relative to the panel 124 to thereby fold the panel 126 (e.g., approximately 180°, etc.) from the deployed (i.e., unfolded) position shown in FIGS. 3C and 3D to the stowed (i.e., folded) position shown in FIGS. 3A and 3B. Although shown as including two folding panels 124 and 126, the table leaf 104 may include any other number of folding panels (e.g., three panels, etc.). In addition or alternatively to the folding motion of the table leaf 104, in some other implementations the table leaf 104 of the tray table 100 is selectively rotatable (e.g., about an approximately vertical axis, about an axis that extends approximately perpendicular to the longitudinal axis 112, about an axis 129, etc.) relative to the base 102 between the stowed position of the table leaf 104 and the deployed position of the table leaf 104. For example, in some implementations, the table leaf 104 includes a panel that is rotated relative to the base 102 (e.g., in the direction of the arrow 130, etc.) to move the table leaf 104 from the stowed position to the deployed position thereof.

From the deployed position shown in FIG. 3C, the tray table 100 can be moved to a partially-extended position of the tray table 100, which is shown in FIG. 3D. Specifically, in the partially-extended position of the tray table 100, the base 102 is partially collapsed (e.g., retracted partially inwardly, etc.) along the longitudinal axis 112 such that the table leaf 104 is moved along the longitudinal axis 112 in the direction of the arrow 132 relative to the position of the table leaf 104 in the extended position of the tray table 100 shown in FIGS. 3B and 3C. In other words, the base 102 of the tray table 100 includes a partially-extended position shown in FIG. 3D that corresponds to the partially-extended position of the tray table 100 (i.e., the base 102 is moved into the partially-extended position thereof to thereby move the tray table 100 into the partially-extended position thereof).

Although shown in FIG. 3D as being in the deployed position when the tray table 100 is in the partially-extended position, the table leaf 104 is not limited thereto. In some implementations, the table leaf 104 is moveable between the various positions of the table leaf 104 (e.g., the stowed position, the deployed position, one or more intermediate positions between the stowed and deployed positions, etc.) when the tray table 100 is in the partially-extended position. Moreover, in some implementations the table leaf 104 is locked into a position (e.g., the stowed position, the deployed position, one or more intermediate positions between the stowed and deployed positions, etc.) when the tray table 100 is in the partially-extended position.

In some implementations, the partially-extended position of the tray table 100 is an egress position of the tray table 100. The egress position of the tray table 100, for example, enables an occupant of the corresponding seat to stand up and/or leave the seat, provides the occupant with greater freedom of movement, provides the occupant with more arm and/or leg space, etc. Moreover, in some implementations, the partially-extended position of the tray table 100 is a position that enables the occupant of the corresponding seat to use the table leaf 104 as a desk (e.g., for writing, reading, supporting a laptop computer, eating, use as a cocktail and/or other drink table, etc.).

In operation, the tray table 100 is deployed for use by pulling on the tray table 100 in the direction of the arrow 134 to thereby move the tray table 100 from the stowed position of the tray table 100 shown in FIG. 3A to the extended position of the tray table 100 shown in FIG. 3B. The table leaf 104 of the tray table 100 is then unfolded from the stowed position of the table leaf 104 shown in FIGS. 3A and 3B to the deployed position of the table leaf 104 shown in FIG. 3C. As shown, in the exemplary implementation, the table leaf 104 is unfolded approximately 180° from the stowed position of the table leaf 104 shown in FIGS. 3A and 3B to the deployed position of the table leaf 104 shown in FIG. 3C. Other angular differences between the stowed and deployed positions of the table leaf 104 are contemplated as being within the scope of the present application.

Referring now to FIG. 4, the base 102 of the tray table 100 includes a base plate 136 into which the rail mounts 118 of the rail system 114 are incorporated (e.g., the rail mount 118 is mounted to the base plate 136 as shown in the exemplary implementation of FIG. 4, the rail mount 118 is integrally formed as a single unitary structure with the base plate 136, etc.).

The base 102 of the tray table 100 includes a telescoping carriage 138. For example, the carriage 138 is configured to telescope inwardly and outwardly along the longitudinal axis 112 to move the tray table 100 between the stowed position of the tray table 100 and the extended position of the tray table 100. Specifically, the carriage 138 is configured to expand outwardly and retract inwardly along the longitudinal axis 112, and relative to the base plate 136, between an extended position of the carriage 138 shown in FIGS. 4, 6C, and 7C and a retracted position of the carriage 138 shown in FIGS. 6A and 7A. The retracted position of the carriage 138 corresponds to the stowed position of the tray table 100 (i.e., the carriage 138 is moved into the retracted position to move the tray table 100 into the stowed position). The extended position of the carriage 138 corresponds to the extended position of the tray table 100 (i.e., the carriage 138 is moved into the extended position to thereby move the tray table 100 into the extended position). The carriage 138 includes a partially-extended position (shown in FIGS. 6B and 7B) that corresponds to the partially-extended position of the tray table 100 (i.e., the carriage 138 is moved into the partially-extended position thereof to thereby move the tray table 100 into the partially-extended position thereof).

The carriage 138 holds the table leaf 104, which is shown in phantom in FIG. 4. In other words, the table leaf 104 of the tray table 100 is mounted on the carriage 138 such that the table leaf 104 is carried by the carriage 138 for movement with the carriage 138 as the carriage 138 telescopes inwardly and outwardly between the retracted and extended positions thereof.

The telescoping movement of the carriage 138 is enabled by the rail system 114. In other words, the rails 116 and 118 of the rail system 114 are operatively connected to the carriage 138 such that the rails 116 and 118 guide movement of the carriage 138 between the extended position, the partially-extended position, and the retracted position of the carriage 138. In other words, the rails 116 and 118 are operatively connected to the carriage 138 such that the rails 116 and 118 guide movement of the carriage 138 between the extended position, the partially-extended position, and the stowed position of the tray table 100. For example, in the exemplary implementation, the carriage 138 is slidably interconnected with each rail 116 using a slide block assembly 140 and enables the carriage 138 and the rail 116 to slide relative to each other along the longitudinal axis 112. The rails 116 and 118 are also slidably interconnected with each other in the exemplary implementation using a slide block assembly 142 that enables the rails 116 and 118 to slide relative to each other along the longitudinal axis 112.

For example, and referring now to FIG. 5, the exemplary slide block assemblies 140 include slide blocks 144 that are mounted (e.g., rigidly, floating, etc.) to the carriage 138 for enabling sliding movement of the carriage 138 along the longitudinal axis 112 relative to the rails 116; and the exemplary slide block assemblies 142 include slide blocks 146 that are mounted (e.g., rigidly, floating, etc.) to corresponding rails 118a or 118b for enabling sliding movement of the rails 116a and 116b along the longitudinal axis 112 relative to the rails 118a and 118b, respectively. The carriage 138 and the rail mount 118a are shown in phantom in FIG. 5 to better illustrate the slide block assemblies 140 and 142, respectively. Each slide block 144 is configured to slide within a channel 148 of the corresponding rail 116a or 116b to thereby enable sliding movement of the carriage 138 along the longitudinal axis 112 relative to the rails 116. Each slide block 146 is configured to slide within a channel 150 of the corresponding rail 116a or 116b to enable movement of the rails 116 along the longitudinal axis 112 relative to the rails 118. In the exemplary implementation, the slide block assemblies 140 and 142 do not include any bearings. The slide block assemblies 140 and 142 may reduce the amount of noise emitted by the rail system 114 during operation thereof (e.g., during telescoping movement of the carriage 138 between the retracted and extended positions, etc.), for example as compared to at least some known rail systems (e.g., rail systems using wheels and/or bearing, etc.). In other words, operation of the exemplary implementation of the rail system 114 may be quieter as compared to at least some known rail systems (e.g., rail systems using wheels and/or bearing, etc.). Operation of the exemplary implementation of the rail system 114 is also less prone to coasting when moved.

Although in the exemplary implementation the slide blocks 144 and 146 are mounted to the carriage 138 and the rail mounts 118, respectively, in other implementations one or more slide blocks 144 is integrally formed as a single unitary structure with the carriage 138 and/or one or more of the slide blocks 146 is integrally formed as a single unitary structure with the corresponding rail mount 118.

As described above, in the exemplary implementation, the slide blocks 144 are incorporated into the carriage 138 and the slide blocks 146 are incorporated into the rail mounts 118. In some other exemplary implementations, one or more slide blocks 144 is incorporated into (e.g., mounted to, integrally formed as a single unitary structure with, etc.) the corresponding rail 116 and configured to slide within a channel (not shown) of the carriage 138; and/or one or more slide blocks 146 is incorporated into (e.g., mounted to, integrally formed as a single unitary structure with, etc.) the corresponding rail 116 and configured to slide within a channel (not shown) of the corresponding rail mount 118.

Any other slide block arrangement, configuration, structure, geometry and/or the like may be used in addition or alternatively to the slide block assemblies 140 and/or 142. Moreover, any other arrangement, configuration, structures, geometry and/or the like may be used in addition or alternatively to slide block assemblies, such as, but not limited to, ball bearing assemblies (not shown), wheels, and/or the like.

Figure 6A:
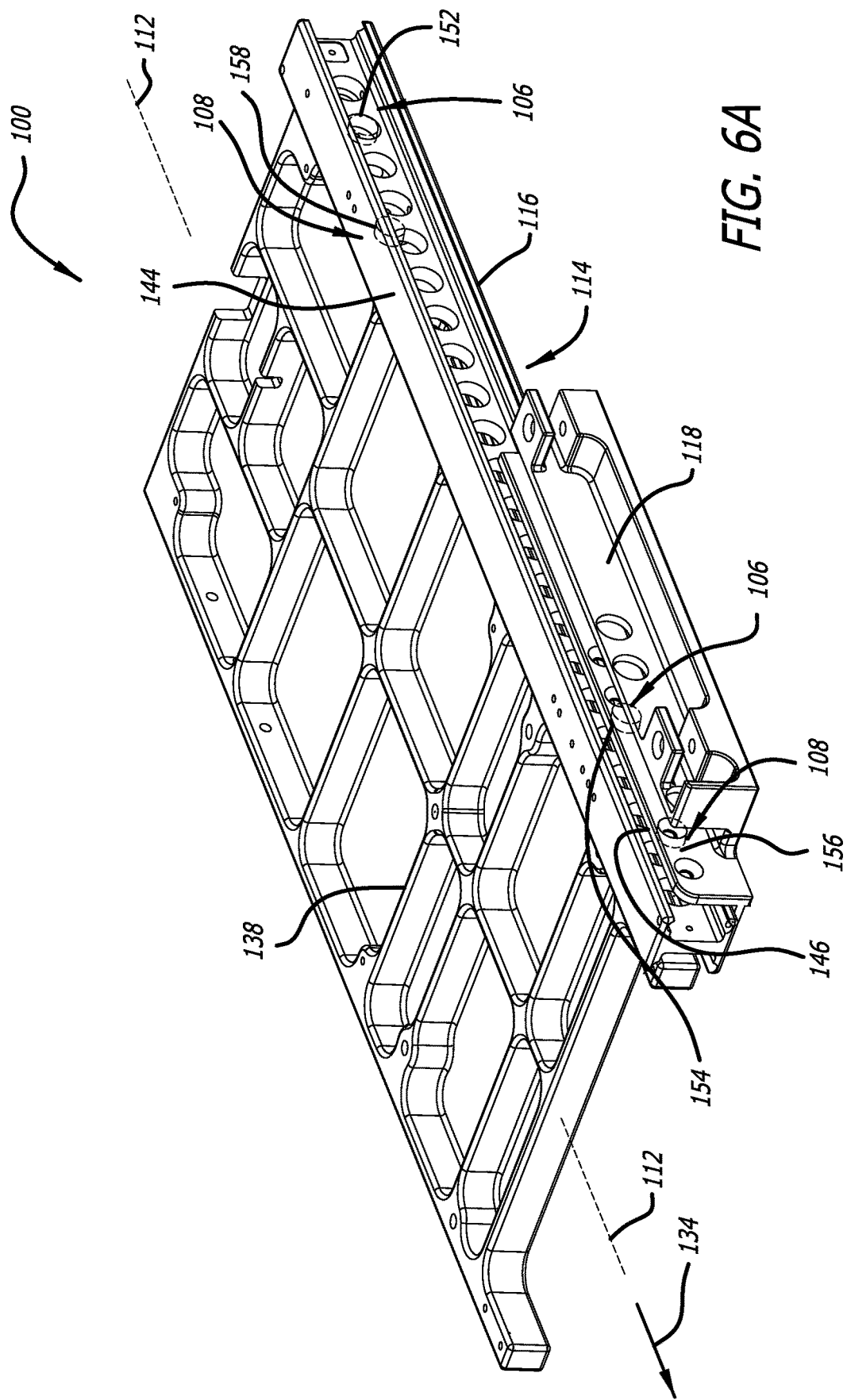
FIGS. 6A-6C illustrate isometric views of a portion of the tray table shown in FIGS. 1 and 2 illustrating operation of magnetic detents of the tray table according to an implementation.
Figure 6B:
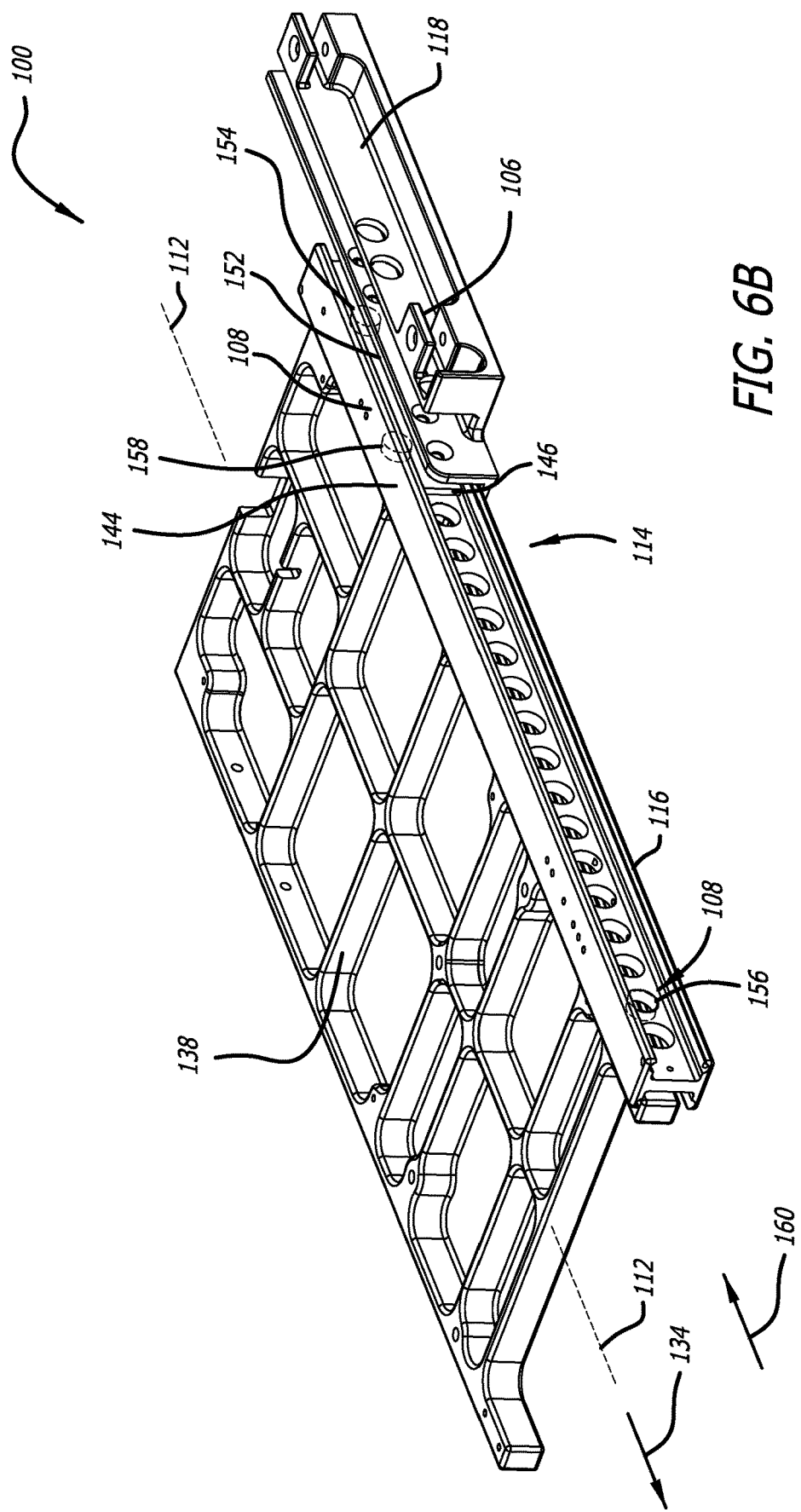
Figure 6C:
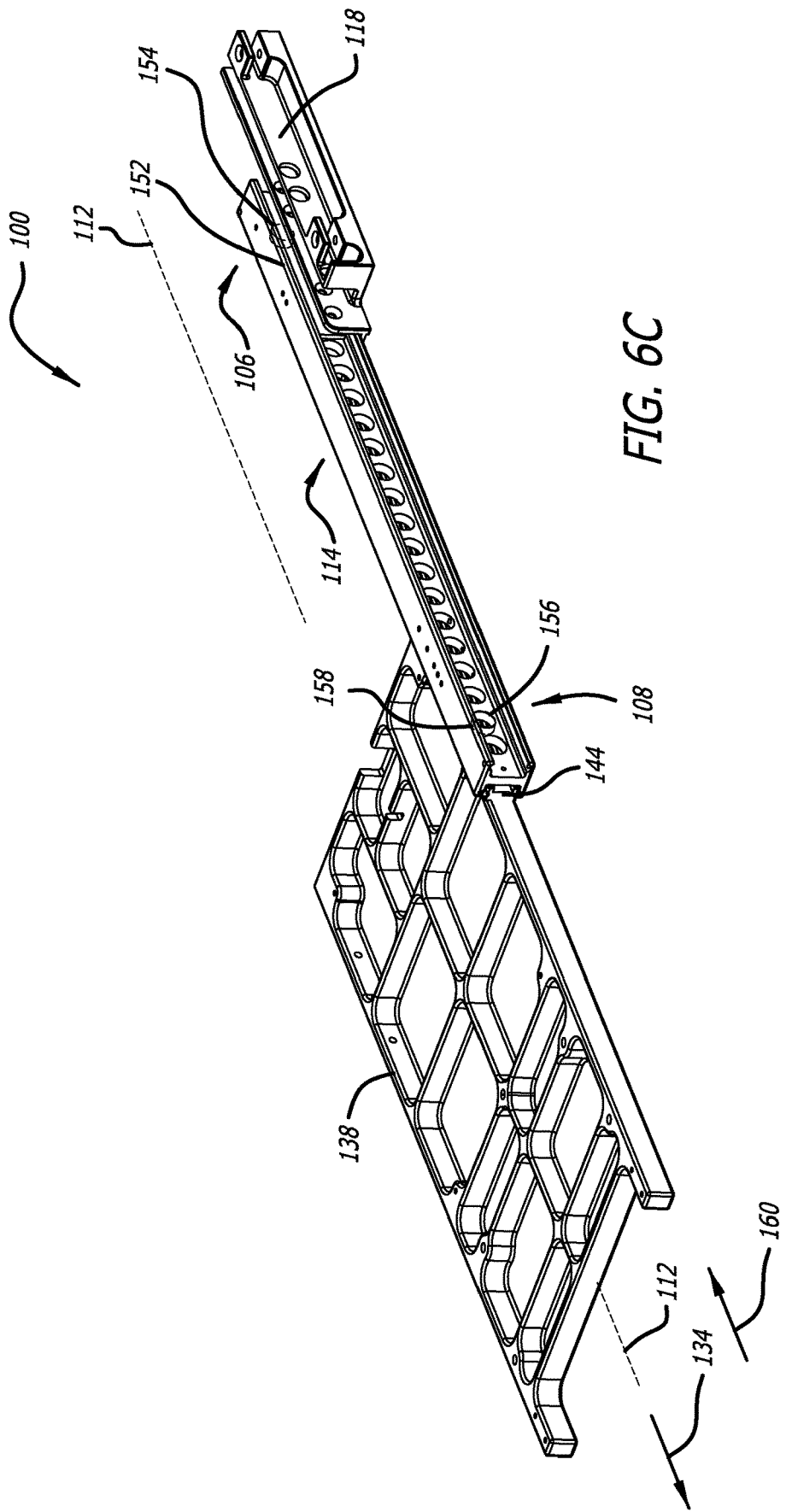
Figure 7A:
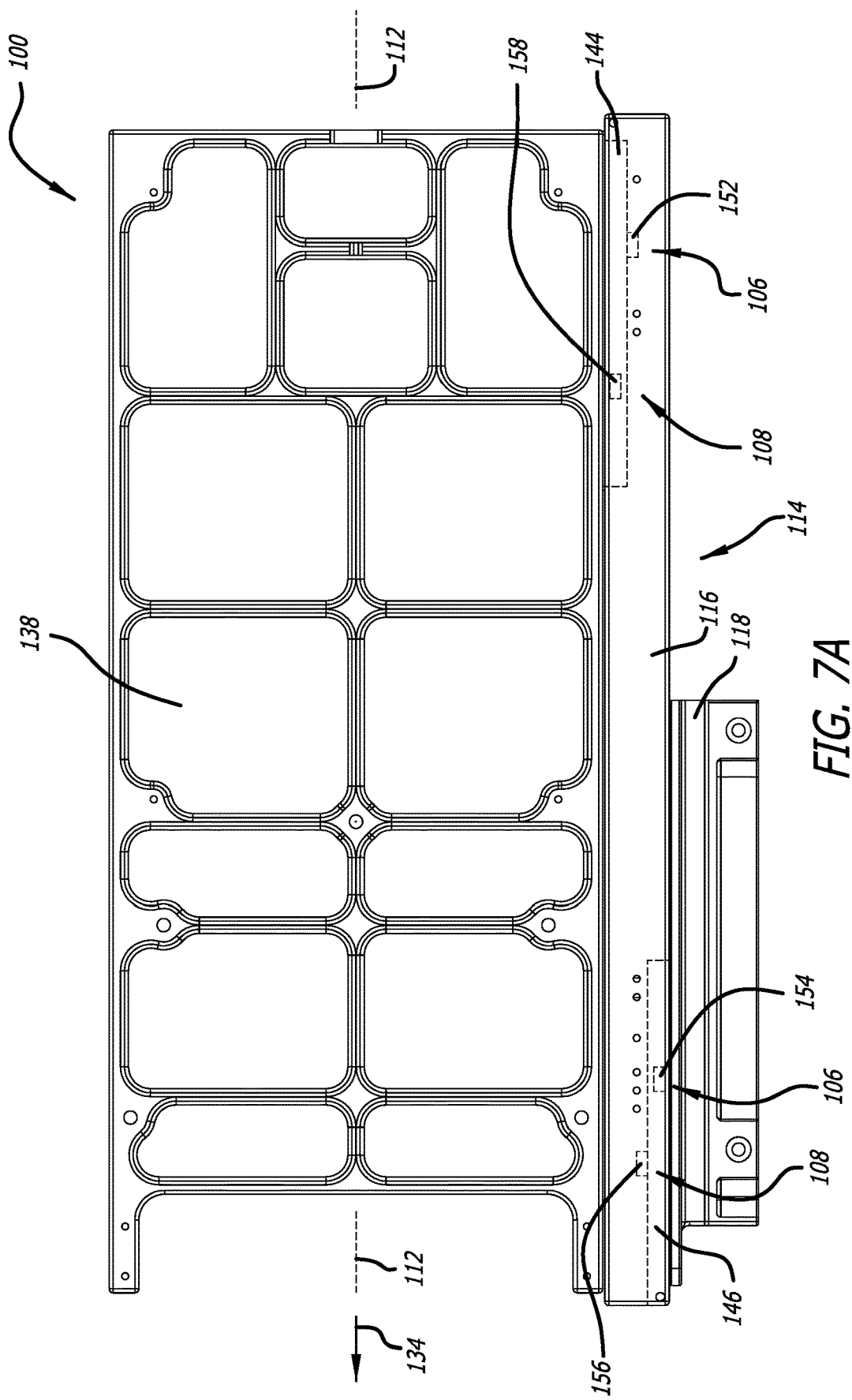
FIGS. 7A-7C illustrate top plan views illustrating operation of the magnetic detents show in FIG. 6 according to an implementation.
Figure 7B:
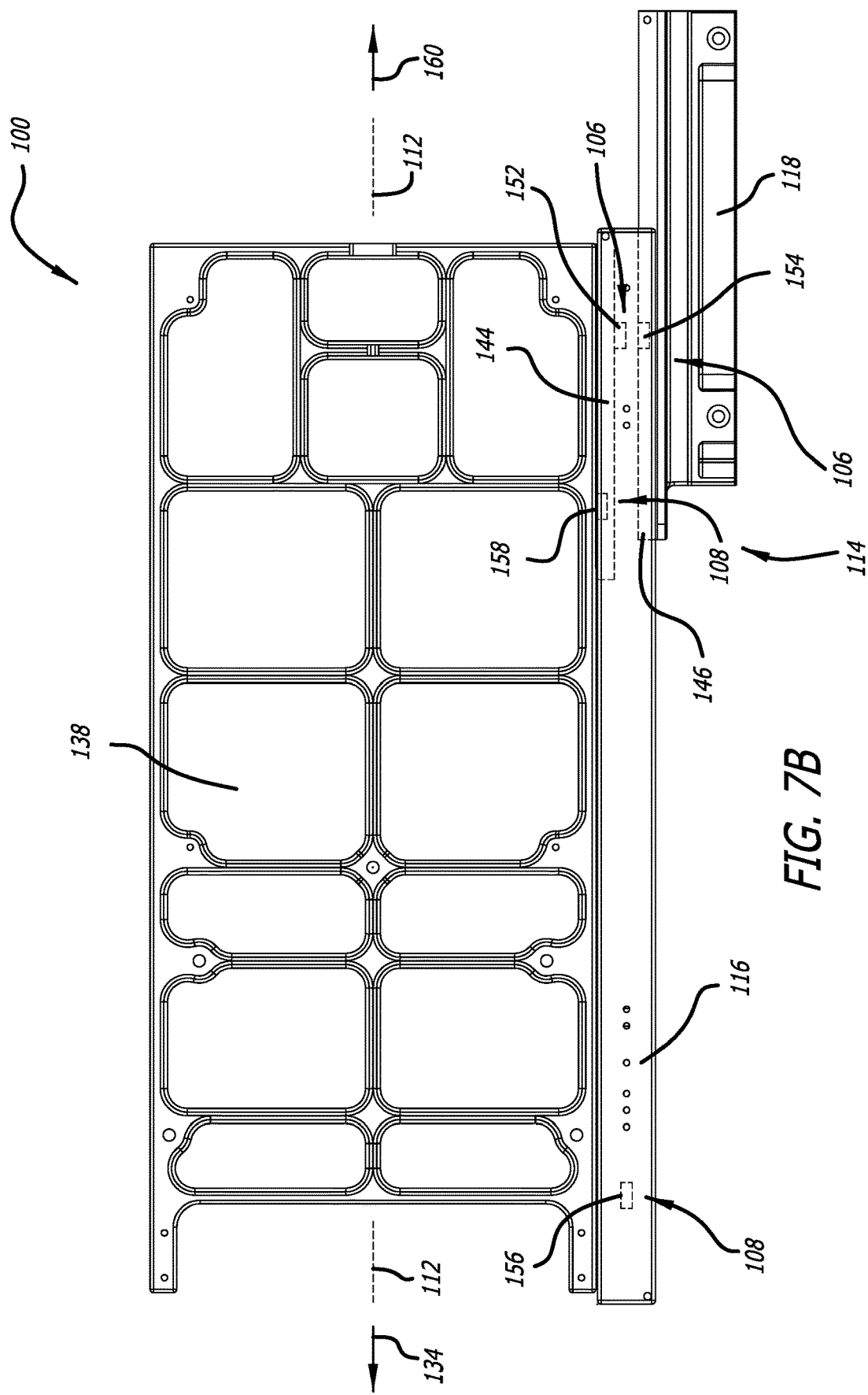
Figure 7C:
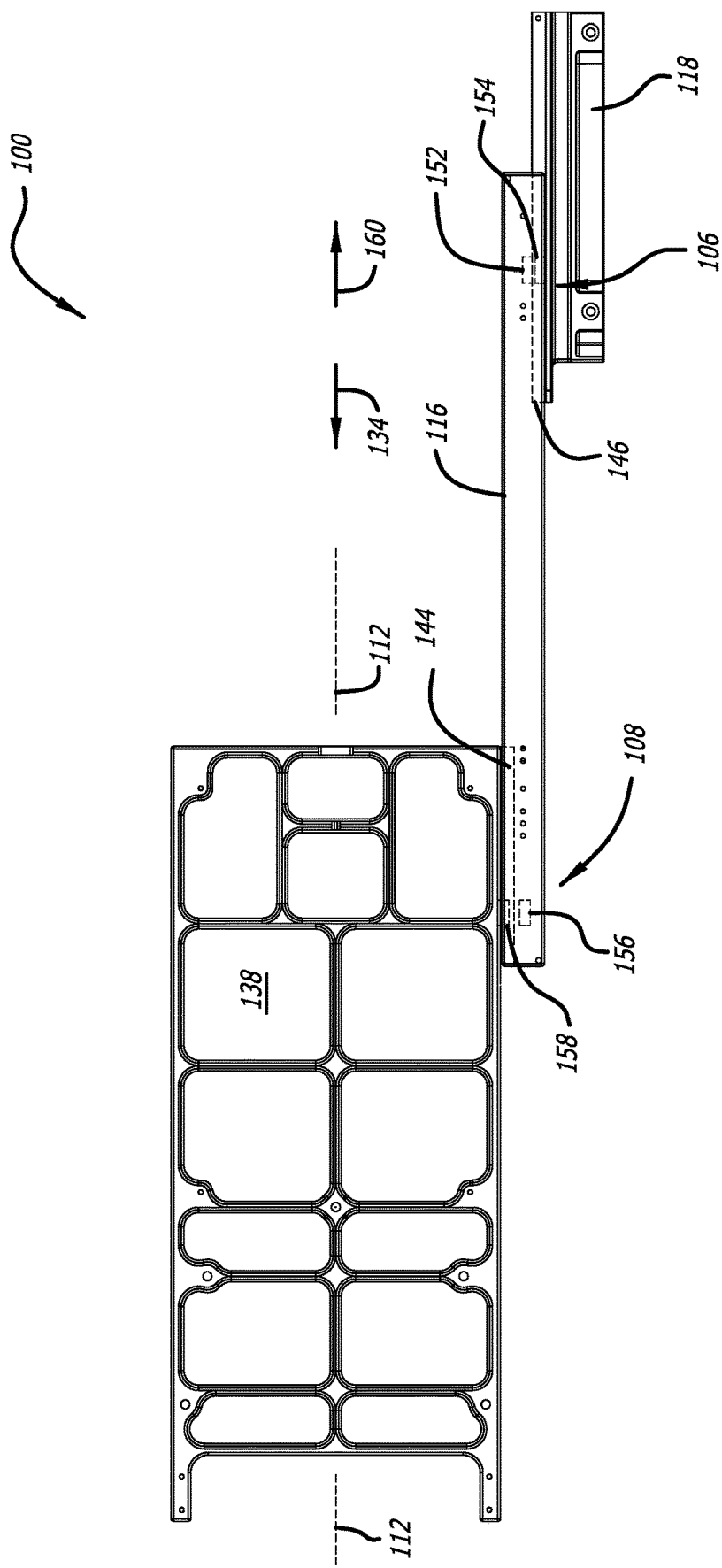

Referring now to FIGS. 6 and 7, as briefly described above, the exemplary implementation of the tray table 100 includes the magnetic detents 106 and 108, which are configured to releasably hold the tray table 100 in the partially-extended position (shown in FIGS. 6B and 7B) and the extended position (shown in FIGS. 6C and 7C) thereof, respectively. For example, in the exemplary implementation the rails 116 and rail mounts 118 of the rail system 114 and the carriage 138 include the magnetic detents 106 and 108. The magnetic detent 106 will be referred to herein as a "first magnetic detent", while the magnetic detent 108 will be referred to herein as a "second magnetic detent". Each rail 116 will be referred to herein as a "first rail", and each rail mount 118 will be referred to herein as a "second rail".

The first magnetic detent 106 includes first and second magnetic components 152 and 154, respectively, of the first and second rails 116 and 118, respectively. In other words, the first rail 116 includes the first magnetic component 152 (i.e., the first magnetic component 152 is incorporated into the first rail 116) and the second rail mount 118 includes the second magnetic component 154 (i.e., the second magnetic component 154 is incorporated into the second rail mount 118). As will be described below, the magnetic components 152 and 154, respectively, cooperate to releasably hold the carriage 138 and tray table 100 in the partially-extended position.

The first and second magnetic components 152 and 154, respectively, are each configured such that the magnetic components 152 and 154 are magnetically attracted to each other. For example, in some implementations at least one of the magnetic components 152 or 154 includes one or more magnets that generates a magnetic field that is configured to magnetize a ferromagnetic material of the other magnetic component 152 or 154 when the magnetic components 152 and 154 are within a predetermined distance from each other. In some implementations, and for example, each of the magnetic components 152 and 154 includes one or more magnets that are magnetically attracted to each other when within the predetermined distance of each other. Each of the magnetic components 152 and 154 may include any number of magnets.

As briefly described above, the magnetic components 152 and 154 cooperate with each other to releasably hold the carriage 138 and tray table 100 in the partially-extended position. For example, and as is shown in FIGS. 6B and 7B, the magnetic components 152 and 154 are positioned at respective locations along the first rail 116 and the second rail mount 118 such that the magnetic components 152 and 154 are at least partially aligned along the longitudinal axis 112, and thereby within the predetermined distance of each other, when the carriage 138 is in the partially-extended position. Accordingly, when the carriage 138 and tray table 100 are in the partially-extended position, the magnetic attraction between the magnetic components 152 and 154 releasably holds the carriage 138 and tray table 100 in the partially-extended position.

In the exemplary implementation, the first magnetic component 152 is a discrete component from a body of the first rail 116 that is held by the body of the first rail 116 using any suitable method, means, fastener, and/or the like (e.g., adhesive, a weld, a braze, a threaded fastener, a rivet, a pin, an interference fit, a clearance fit, a transition fit, a snap fit, a clip, a clamp, a latch, etc.). In other examples, the first magnetic component 152 is defined by at least a portion of the body of the first rail 116, is integrally formed as a single unitary structure with the body of the first rail 116, is at least partially embedded and/or encapsulated within the body of the first rail 116, and/or the like. For example, one or more segments of the body of the first rail 116 may define the first magnetic component 152 while one or more other segments of the body of the first rail 116 are non-magnetic, etc.

In the exemplary implementation, the second magnetic component 154 is a discrete component from a body of the slide block 146 of the second rail mount 118 that is held by the body of the slide block 146 using any suitable method, means, fastener, and/or the like (e.g., adhesive, a weld, a braze, a threaded fastener, a rivet, a pin, an interference fit, a clearance fit, a transition fit, a snap fit, a clip, a clamp, a latch, etc.). In other examples, the second magnetic component 154 is defined by at least a portion of the body of the slide block 146, is integrally formed as a single unitary structure with the body of the slide block 146, is at least partially embedded and/or encapsulated within the body of the slide block 146, and/or the like. For example, one or more segments of the body of the slide block 146 may define the second magnetic component 154 while one or more other segments of the body of the slide block 146 are non-magnetic, etc. In still other examples, another component of the second rail mount 118 (e.g., a body of the second rail mount 118) includes the second magnetic component 154 of the first magnetic detent 106. For example, in some implementations the second magnetic component 154 is: held by the body of the second rail mount 118, defined by at least a portion of the body of the second rail mount 118, integrally formed as a single unitary structure with the body of the second rail mount 118, at least partially embedded and/or encapsulated within the body of the second rail mount 118; and/or the like.

Various parameters of the first and second magnetic components 152 and 154, respectively, can be selected to enable the magnetic attraction therebetween to releasably hold the carriage 138 and tray table 100 in the partially-extended position, such as, but not limited to, the strength of the magnet(s) of the magnetic components 152 and/or 154, the distance between the magnetic components 152 and 154 when the carriage 138 and tray table 100 are in the partially-extended position, and/or the like. Each magnet of the first magnetic component 152 and/or the second magnetic component 154 may have any number of poles that enable the magnetic components 152 and 154 to function as disclosed herein (e.g., be magnetically attracted to each other, to releasably hold the carriage 138 in the partially-extended position, etc.). Examples of the number of poles of a magnet of the first magnetic component 152 and/or the second magnetic component 154 include, but are not limited to, a single pole, two poles, four poles, six poles, eight poles, ten poles, an even number of poles greater than ten poles, and/or the like.

In some implementations, the first magnetic detent 106 is configured to generate an audible and/or tactile indication when the carriage 138, and thus the tray table 100, moves into the partially-extended position. Specifically, the magnetic components 152 and 154 of the first magnetic detent 106 are configured in one implementation to cooperate to generate an audible and/or tactile indication that indicates that the carriage 138 and tray table 100 have moved into the partially-extended position. There may also be an audible indication that the carriage 138 and tray table 100 have moved into the partially-extended position. For example, friction generated via sliding engagement of the magnetic components 152 and 154 with each other as the carriage 138 moves into the partially-extended position may generate a snap action that may emit an audible and/or tactile indication that the carriage 138 and tray table 100 have moved into the partially-extended position. In another example, the rate at which the magnetic components 152 and 154 are drawn together into alignment with each other once within the predetermined distance of each other is selected (e.g., via the size and/or strength of the magnetic components 152 and/or 154, via the number and/or configuration of the poles of the magnetic components 152 and/or 154, etc.) to provide force feedback that generates an audible and/or tactile indication that the carriage 138 and tray table 100 have moved into the partially-extended position. In another example, the increase in resistance to further movement of the carriage 138 generated when the magnetic components 152 and 154 align with each other is selected (e.g., via the size and/or strength of the magnetic components 152 and/or 154, via the number and/or configuration of the poles of the magnetic components 152 and/or 154, etc.) to provide force feedback that generates an audible and/or tactile indication that the carriage 138 and tray table 100 have moved into the partially-extended position.

In some implementations, a four-pole configuration provides a greater attraction force between the magnetic components 152 and 154 at smaller distances (e.g., the distance between the magnetic components 152 and 154 when the carriage 138 and tray table 100 are in the partially-extended position, etc.), while the four-pole configuration provides a reduced attraction force between the magnetic components 152 and 154 at greater distances (e.g., the distance between the magnetic components 152 and 154 as the carriage 138 and tray table 100 are moved away from or toward the partially-extended position thereof, etc.). In this way, a four-pole configuration facilitates generating force feedback that generates an audible and/or tactile indication as the carriage 138 and tray table 100 move into the partially-extended position.

The second magnetic detent 108 includes third and fourth magnetic components 156 and 158, respectively, of the first rail 116 and the carriage 138, respectively. In other words, the first rail 116 includes the third magnetic component 156 (i.e., the third magnetic component 156 is incorporated into the first rail 116) and the carriage 138 includes the fourth magnetic component 158 (i.e., the fourth magnetic component 158 is incorporated into the carriage 138). As will be described below, the magnetic components 156 and 158, respectively, cooperate to releasably hold the carriage 138 and tray table 100 in the extended position.

The third and fourth magnetic components 156 and 158, respectively, are each configured such that the magnetic components 156 and 158 are magnetically attracted to each other. For example, in some implementations at least one of the magnetic components 156 or 158 includes one or more magnets that generates a magnetic field that is configured to magnetize a ferromagnetic material of the other magnetic component 156 or 158 when the magnetic components 156 and 158 are within a predetermined distance from each other. In some implementations, and for example, each of the magnetic components 156 and 158 includes one or more magnets that are magnetically attracted to each other when within the predetermined distance of each other. Each of the magnetic components 156 and 158 may include any number of magnets.

As briefly described above, the magnetic components 156 and 158 cooperate with each other to releasably hold the carriage 138 and tray table 100 in the extended position. For example, and as is shown in FIGS. 6C and 7C, the magnetic components 156 and 158 are positioned at respective locations along the first rail 116 and the carriage 138 such that the magnetic components 156 and 158 are at least partially aligned along the longitudinal axis 112, and thereby within the predetermined distance of each other, when the carriage 138 is in the extended position. Accordingly, when the carriage 138 and tray table 100 are in the extended position, the magnetic attraction between the magnetic components 156 and 158 releasably holds the carriage 138 and tray table 100 in the extended position.

In the exemplary implementation, the third magnetic component 156 is a discrete component from a body of the first rail 116 that is held by the body of the first rail 116 using any suitable method, means, fastener, and/or the like (e.g., adhesive, a weld, a braze, a threaded fastener, a rivet, a pin, an interference fit, a clearance fit, a transition fit, a snap fit, a clip, a clamp, a latch, etc.). In other examples, the third magnetic component 156 is defined by at least a portion of the body of the first rail 116, is integrally formed as a single unitary structure with the body of the first rail 116, is at least partially embedded and/or encapsulated within the body of the first rail 116, and/or the like. For example, one or more segments of the body of the first rail 116 may define the third magnetic component 156 while one or more other segments of the body of the first rail 116 are non-magnetic, etc.

In the exemplary implementation, the fourth magnetic component 158 is a discrete component from a body of the slide block 144 of the carriage 138 that is held by the body of the slide block 144 using any suitable method, means, fastener, and/or the like (e.g., adhesive, a weld, a braze, a threaded fastener, a rivet, a pin, an interference fit, a clearance fit, a transition fit, a snap fit, a clip, a clamp, a latch, etc.). In other examples, the fourth magnetic component 158 is defined by at least a portion of the body of the slide block 144, is integrally formed as a single unitary structure with the body of the slide block 144, is at least partially embedded and/or encapsulated within the body of the slide block 144, and/or the like. For example, one or more segments of the body of the slide block 144 may define the fourth magnetic component 158 while one or more other segments of the body of the slide block 144 are non-magnetic, etc. In still other examples, another component of the carriage 138 (e.g., a body of the carriage 138) includes the fourth magnetic component 158 of the second magnetic detent 108. For example, in some implementations the fourth magnetic component 158 is: held by the body of the carriage 138, defined by at least a portion of the body of the carriage 138, integrally formed as a single unitary structure with the body of the carriage 138, at least partially embedded and/or encapsulated within the body of the carriage 138; and/or the like.

Various parameters of the third and fourth magnetic components 156 and 158, respectively, can be selected to enable the magnetic attraction therebetween to releasably hold the carriage 138 and tray table 100 in the extended position, such as, but not limited to, the strength of the magnet(s) of the magnetic components 156 and/or 158, the distance between the magnetic components 156 and 158 when the carriage 138 and tray table 100 are in the extended position, and/or the like. Each magnet of the third magnetic component 156 and/or the fourth magnetic component 158 may have any number of poles that enable the magnetic components 156 and 158 to function as disclosed herein (e.g., be magnetically attracted to each other, to releasably hold the carriage 138 in the extended position, etc.). Examples of the number of poles of a magnet of the third magnetic component 156 and/or the fourth magnetic component 158 include, but are not limited to, a single pole, two poles, four poles, six poles, eight poles, ten poles, an even number of poles greater than ten poles, and/or the like.

In some implementations, the second magnetic detent 108 is configured to generate an audible and/or tactile indication when the carriage 138, and thus the tray table 100, moves into the extended position. Specifically, the magnetic components 156 and 158 of the second magnetic detent 108 are configured in one implementation to cooperate to generate an audible and/or tactile indication that indicates that the carriage 138 and tray table 100 have moved into the extended position. For example, friction generated via sliding engagement of the magnetic components 156 and 158 with each other as the carriage 138 moves into the extended position may generate a snap action that emits an audible and/or tactile indication that the carriage 138 and tray table 100 have moved into the extended position. In another example, the rate at which the magnetic components 156 and 158 are drawn together into alignment with each other once within the predetermined distance of each other is selected (e.g., via the size and/or strength of the magnetic components 156 and/or 158, via the number and/or configuration of the poles of the magnetic components 156 and/or 158, etc.) to provide force feedback that generates an audible and/or tactile indication that the carriage 138 and tray table 100 have moved into the extended position. In another example, the increase in resistance to further movement of the carriage 138 generated when the magnetic components 156 and 158 align with each other is selected (e.g., via the size and/or strength of the magnetic components 156 and/or 158, via the number and/or configuration of the poles of the magnetic components 156 and/or 158, etc.) to provide force feedback that generates an audible and/or tactile indication that the carriage 138 and tray table 100 have moved into the extended position.

In some implementations, a four-pole configuration provides a greater attraction force between the magnetic components 156 and 158 at smaller distances (e.g., the distance between the magnetic components 156 and 158 when the carriage 138 and tray table 100 are in the extended position, etc.), while the four-pole configuration provides a reduced attraction force between the magnetic components 156 and 158 at greater distances (e.g., the distance between the magnetic components 156 and 158 as the carriage 138 and tray table 100 are moved away from or toward the extended position thereof, etc.). In this way, a four-pole configuration facilitates generating force feedback that generates an audible and/or tactile indication as the carriage 138 and tray table 100 move into the extended position.

In operation, as the user moves (e.g., pulls, pushes, etc.) the carriage 138 of the tray table 100 in the direction 134 from the retracted position of the carriage 138 and tray table 100 (also referred to as the stowed position of the tray table 100) shown in FIGS. 6A and 7A toward the extended position thereof, the first rail 116 moves along with the carriage 138 (relative to the base plate 136) in the direction 134. For example, stiction between the first rail 116 and the slide block 144 of the carriage 138 may be sufficient to pull the first rail 116 along with the carriage 138 in the direction 134. As the carriage 138 reaches the partially-extended position thereof, the first and second magnetic components 152 and 154, respectively, of the first magnetic detent 106 align along the longitudinal axis 112 and thereby magnetically interlock with each other to releasably hold the carriage 138 and tray table 100 in the partially-extended position, for example as is shown in FIGS. 6B and 7B.

As described above, in some implementations, the magnetic components 152 and 154 of the first magnetic detent 106 generate an audible and/or tactile indication when the carriage 138 moves into the partially-extended position. The audible and/or tactile indication generated by the magnetic components 152 and 154 as the carriage 138 moves into the partially-extended position informs (e.g., reassures, etc.) the user that the tray table 100 has been successfully moved into the partially-extended position. The tactile and/or audible indication generated by the first magnetic detent 106 improves the user's experience, for example by providing a satisfying feel (e.g., a feeling of quality, etc.) of the movement of the tray table 100 into the partially-extended position, by providing a tray table 100 that is more intuitive to use, etc.

From the partially-extended position shown in FIGS. 6B and 7B, the carriage 138, and thereby the tray table 100, can be moved to the extended position of the carriage 138 and tray table 100, for example as shown in FIGS. 6C and 7C. Specifically, the carriage 138 can be moved in the direction 134 with sufficient force to overcome the magnetic attraction between the magnetic components 152 and 154 of the first magnetic detent 106 and thereby enable the carriage 138 to move in the direction 134 into the extended position of the carriage 138 and tray table 100. As should be apparent from a comparison of FIGS. 7B and 7C, the carriage 138 moves (e.g., slides, etc.) along the longitudinal axis 112 relative to the first rail 116 (in the direction 134) as the carriage 138 moves from the partially-extended position of the carriage 138 and tray table 100 toward and into the extended position of the carriage 138 and tray table 100. In some implementations, the magnetic components 152 and 154 of the first magnetic detent 106 generate an audible and/or tactile indication when the carriage 138 is released from the partially-extended position, which informs (e.g., reassures, etc.) the user that the tray table 100 has been successfully moved out of the partially-extended position.

As the carriage 138 moves along the longitudinal axis 112 in the direction 134 into the extended position thereof, the third and fourth magnetic components 156 and 158, respectively, of the second magnetic detent 108 align along the longitudinal axis 112 and thereby magnetically interlock with each other to releasably hold the carriage 138 and tray table 100 in the extended position, for example as is shown in FIGS. 6C and 7C. As described above, in some implementations, the magnetic components 156 and 158 of the second magnetic detent 108 generate an audible and/or tactile indication when the carriage 138 moves into the extended position. The audible and/or tactile indication generated by the magnetic components 156 and 158 as the carriage 138 moves into the extended position informs (e.g., reassures, etc.) the user that the tray table 100 has been successfully moved into the extended position. The tactile and/or audible indication generated by the second magnetic detent 108 improves the user's experience, for example by providing a satisfying feel (e.g., a feeling of quality, etc.) of the movement of the tray table 100 into the extended position, by providing a tray table 100 that is more intuitive to use, etc.

From the extended position of the carriage 138 and tray table 100 shown in FIGS. 6C and 7C, the carriage 138, and thereby the tray table 100, can be moved back to the partially-extended position thereof by moving (e.g., pushing, pulling, etc.) the carriage 138 in the direction of the arrow 160 with sufficient force to overcome the magnetic attraction between the magnetic components 156 and 158 and thereby enable the carriage 138 to move relative to the first rail 116 in the direction 160 toward the retracted position of the carriage 138 shown in FIGS. 6A and 7A. For example, stiction between the first rail 116 and the slide block 146 of the second rail mount 118 may be sufficient to hold the first rail 116 in position along the longitudinal axis 112 as the carriage 138 moves relative to the first rail 116 from the extended position of the carriage 138 and tray table 100 toward and into the partially-extended position of the carriage 138 and tray table 100. In some implementations, the magnetic components 156 and 158 of the second magnetic detent 108 generate an audible and/or tactile indication when the carriage 138 is released from the extended position, which informs (e.g., reassures, etc.) the user that the tray table 100 has been successfully moved out of the extended position. As the carriage 138 reaches the partially-extended position thereof, the first and second magnetic components 152 and 154, respectively, of the first magnetic detent 106 align along the longitudinal axis 112 and thereby magnetically interlock with each other to releasably hold the carriage 138 and tray table 100 in the partially-extended position, for example as is shown in FIGS. 6B and 7B.

From the partially-extended position of the carriage 138 and tray table 100, the carriage 138 can be moved in the direction 160 with sufficient force to overcome the magnetic attraction between the magnetic components 152 and 154 and thereby enable the carriage 138 to move relative to the second rail mount 118 in the direction 160 toward and into the retracted (i.e., stowed) position of the carriage 138 and tray table 100, for example as shown in FIGS. 6A and 7A. As the carriage 138 moves in the direction 160 into the retracted position thereof, the first rail 116 moves along with the carriage 138 (e.g., via stiction between the slide block 144 of the carriage and the first rail 116, etc.) relative to the second rail mount 118. As described above, in some implementations, the magnetic components 152 and 154 of the first magnetic detent 106 generate an audible and/or tactile indication when the carriage 138 is released from the partially-extended position, which informs (e.g., reassures, etc.) the user that the tray table 100 has been successfully moved out of the partially-extended position.

Figure 8:
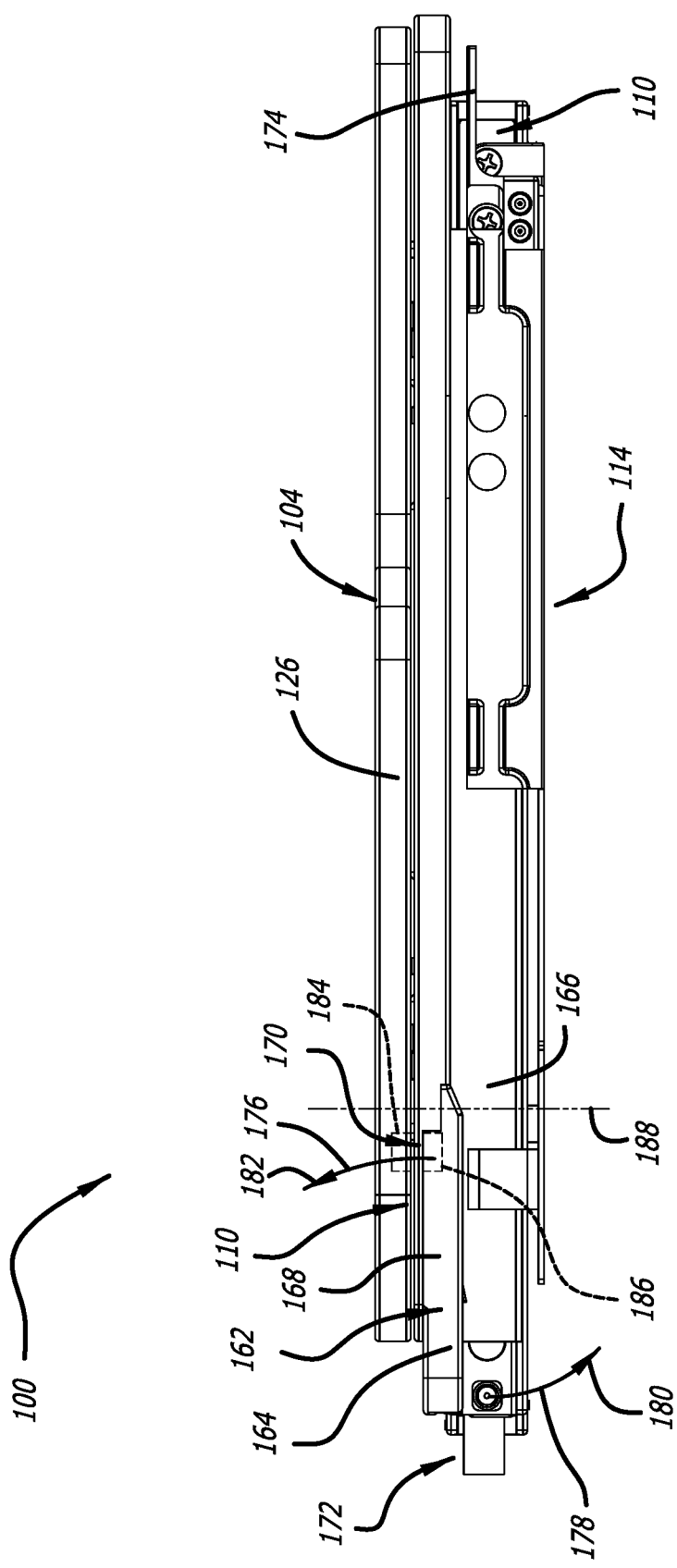
FIG. 8 illustrates an isometric view of the tray table shown in FIGS. 1 and 2 illustrating an interlock assembly according to an implementation.
Figure 9:
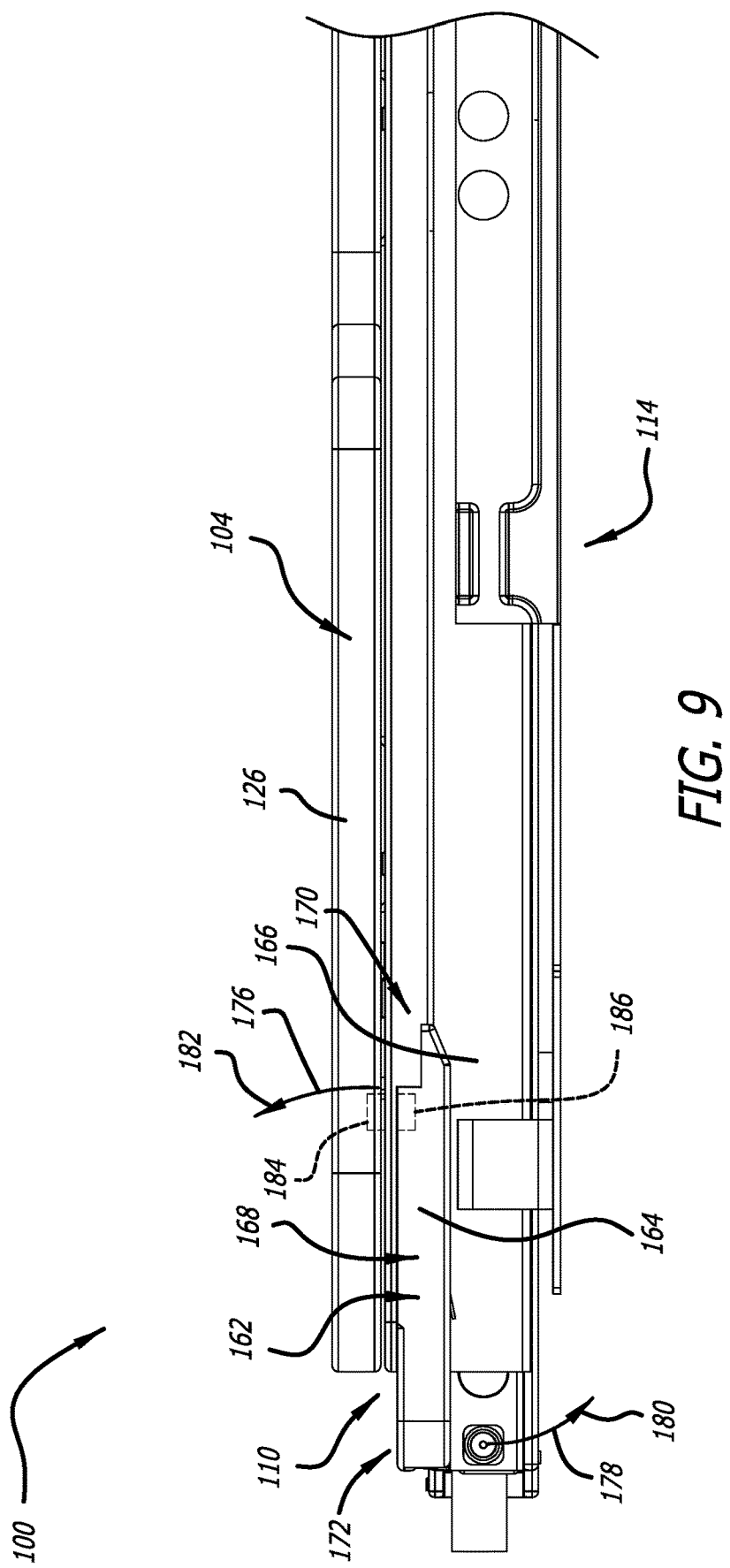
FIG. 9 illustrates an enlarged isometric view illustrating the interlock assembly shown in FIG. 8 according to an implementation.

Referring now to FIGS. 8-10, the exemplary implementation of the tray table 100 includes the interlock assembly 110, which is configured to limit movement of the tray table 100 toward the stowed position of the tray table 100 (e.g., past the partially-extended position of the tray table 100, past an egress position of the tray table 100, etc.) when the table leaf 104 is in the deployed position of the table leaf 104. The interlock assembly 110 includes an interlock 162 that is moveable between an unlocked position and a locked position. FIGS. 8 and 9 illustrate the interlock 162 in the unlocked position, while FIG. 10 illustrates the interlock 162 in the locked position.

In the exemplary implementation, the interlock 162 is configured to pivot between the locked and unlocked positions. For example, the interlock 162 includes a lever 164 that is by the tray table 100 (e.g., by a side plate 166 of the rail system 114, etc.) such that the lever 164 pivots about a fulcrum 168 between the locked and unlocked positions. The exemplary implementation of the lever 164 extends a length from an actuating end portion 170 to a stopping end portion 172. As will be described below, the stopping end portion 172 of the lever 164 is configured to engage a stop 174 (not visible in FIG. 9) of the tray table 100 when the interlock 162 is in the locked position. In the exemplary implementation, the actuating end portion 170 and the stopping end portion 172 of the lever 164 are configured to rotate between the unlocked and locked positions of the interlock 162. For example, the end portions 170 and 172 move along respective arcs 176 and 178 (i.e., rotate about the fulcrum 168) as the lever 164 pivots between the unlocked and locked positions of the interlock 162. Although shown as being positioned at approximately a center of the length of the lever 164, the fulcrum 168 may have any other position along the length of the lever 164 that enables the interlock 162 to function as described and/or illustrated herein.

The lever 164 of the interlock 162 is held by the tray table 100 such that the interlock 162 is biased to the locked position by gravity. There is also a spring to aid in the bias. In other words, in the natural resting position of the lever 164, gravity and the spring hold the stopping end portion 172 in the locked position of the interlock 162 shown in FIG. 10. For example, the stopping end portion 172 of the lever 164 may be provided with a greater weight as compared to the actuating end portion 170 of the lever 164 such that gravity pulls the stopping end portion 172 along the arc 178 in the direction of the arrow 180 in the absence of any forces acting on the actuating end portion 170 along the arc 176 in the direction of the arrow 182.

The interlock 162 includes first and second magnetic components 184 and 186, respectively, of the table leaf 104 and the actuating end portion 170 of the lever 164, respectively. In other words, the table leaf 104 includes the first magnetic component 184 (i.e., the first magnetic component 184 is incorporated into the table leaf 104) and the actuating end portion 170 of the lever 164 includes the second magnetic component 186 (i.e., the second magnetic component 186 is incorporated into the end portion 170 of the lever 164). As will be described below, the magnetic components 184 and 186 cooperate to releasably hold the interlock 162 in the locked position when the table leaf 104 is in the stowed position of the table leaf 104. The magnetic component 184 is not visible in FIG. 10.

The first and second magnetic components 184 and 186, respectively, are each configured such that the magnetic components 184 and 186 are magnetically repulsive to each other when the magnetic components 184 and 186 are within a predetermined distance of each other. For example, in some implementations at least one of the magnetic components 184 or 186 includes one or more magnets that generates a magnetic field that has a different polarity as compared to the other magnetic component 184 or 186. In some implementations, and for example, each of the magnetic components 184 and 186 includes one or more magnets that are magnetically repulsive to each other when within the predetermined distance of each other. Each of the magnetic components 184 and 186 may include any number of magnets.

As briefly described above, the magnetic components 184 and 186 cooperate with each other to releasably hold the interlock 162 in the locked position when the table leaf 104 is in the stowed position of the table leaf 104. For example, the magnetic components 184 and 186 are positioned at respective locations along the panel 126 (not visible in FIG. 10) of the table leaf 104 and the actuating end portion 170 of the lever 164 such that the magnetic components 184 and 186 are at least partially aligned (e.g., along an axis 188, etc.), and thereby within the predetermined distance of each other, when the panel 126 of the table leaf 104 is in the stowed position of the table leaf 104, for example as shown in FIGS. 8 and 9. Accordingly, when the panel 126 of the table leaf 104 is in the stowed position of the table leaf 104, the magnetic repulsion between the magnetic components 184 and 186 acts on the actuating end portion 170 of the lever 164, against the bias of the gravity acting on the stopping end portion 172 of the lever 164, to hold the lever 164 in unlocked position of the interlock 162, for example as shown in FIGS. 8 and 9.

In the exemplary implementation, the first magnetic component 184 is a discrete component from a body of the panel 126 of the table leaf 104 that is held by the body of the first rail 116 using any suitable method, means, fastener, and/or the like (e.g., adhesive, a weld, a braze, a threaded fastener, a rivet, a pin, an interference fit, a clearance fit, a transition fit, a snap fit, a clip, a clamp, a latch, etc.). In some examples, the first magnetic component 184 is defined by at least a portion of the body of table leaf panel 126, is integrally formed as a single unitary structure with the body of the table leaf panel 126, is at least partially embedded and/or encapsulated within the body of the table leaf panel 126, and/or the like. For example, one or more segments of the body of the panel 126 of the table leaf 104 may define the first magnetic component 184 while one or more other segments of the body of the table leaf panel 126 are non-magnetic, etc.

In the exemplary implementation, the second magnetic component 186 is a discrete component from a body of the lever 164 that is held by the body of the lever 164 using any suitable method, means, fastener, and/or the like (e.g., adhesive, a weld, a braze, a threaded fastener, a rivet, a pin, an interference fit, a clearance fit, a transition fit, a snap fit, a clip, a clamp, a latch, etc.). In some examples, the second magnetic component 186 is defined by at least a portion of the body of the lever 164, is integrally formed as a single unitary structure with the body of the lever 164, is at least partially embedded and/or encapsulated within the body of the lever 164, and/or the like. For example, one or more segments of the body of the lever 164 may define the second magnetic component 186 while one or more other segments of the body of the lever 164 are non-magnetic, etc.

Various parameters of the first and second magnetic components 184 and 186, respectively, can be selected to enable the magnetic repulsion therebetween to releasably hold the interlock in the unlocked position, such as, but not limited to, the strength of the magnet(s) of the magnetic components 184 and/or 186, the distance between the magnetic components 184 and 186 when the table leaf 104 is in the stowed position, and/or the like. Each magnet of the first magnetic component 184 and/or the second magnetic component 186 may have any number of poles that enable the magnetic components 184 and 186 to function as disclosed herein (e.g., to magnetically repel each other, to releasably hold the interlock 162 in the unlocked position, etc.). Examples of the number of poles of a magnet of the first magnetic component 184 and/or the second magnetic component 186 include, but are not limited to, a single pole, two poles, four poles, six poles, eight poles, ten poles, an even number of poles greater than ten poles, and/or the like. In some implementations, the first and second magnetic components 184 and 186 are configured to generate an audible and/or tactile indication when the panel 126 of the table leaf 104 is moved into and/or out of the stowed position.

In operation, as the panel 126 of the table leaf 104 is folded from the deployed position of the panel 126 into the stowed position of the table leaf panel 126, the first and second magnetic components 184 and 186, respectively, are moved relative to each other (i.e., brought together) into alignment with each other within the predetermined distance of each other. As the magnetic components 184 and 186 of the panel 126 and the actuating end portion 170 are moved into alignment within the predetermined distance of each other, the magnetic repulsion between the magnetic components 184 and 186 moves the actuating end portion 170 of the lever 174 along the arc 176 in the direction 182, against the bias of the gravity acting on the stopping end portion 172 of the lever 164, to thereby move the lever 164 of the interlock 162 from the locked position to the unlocked position of the interlock 162. Accordingly, when the panel 126 of the table leaf 104 is in the stowed position of the table leaf 104 (e.g., as shown in FIGS. 8 and 9, etc.), the repulsive force between the magnetic components 184 and 186 releasably holds the interlock 162 in the unlocked position.

As the panel 126 of the table leaf 104 is moved (e.g., unfolds in the exemplary implementation, etc.) from the stowed position shown in FIGS. 8 and 9 to the deployed position shown in FIG. 10, the magnetic components 184 and 186 are moved away from each other such that the magnetic components are no longer within the predetermined distance of each other. Accordingly, the repulsive force between the magnetic components 184 and 186 is removed such that the interlock 162 is moved from the unlocked position to the locked position by gravity when the panel 126 of the table leaf 104 unfolds from the stowed position toward the deployed position of the table leaf 104. It should be understood that the interlock assembly 110 is not limited for use with table leaves 104 that fold and unfold between the stowed and deployed positions. Rather, the interlock assembly 110 may be used with a table leaf 104 that rotate between the stowed and deployed positions thereof. For example, rotation of the table leaf 104 from the stowed position into the deployed position will move the magnetic components 184 and 186 away from outside of the predetermined distance of each other.

As briefly described above, the interlock assembly 110 is configured to limit movement of the tray table 100 toward the stowed position of the tray table 100 when the table leaf 104 is in the deployed position of the table leaf 104. For example, in the locked position of the interlock 162 shown in FIG. 10, the stopping end portion 172 of the lever 164 is aligned along a path P of the stop 174 such that the stopping end portion 172 of the lever 164 is configured to engage the stop 174 when the carriage 138 is moved toward the stowed position. The stop 174 can be positioned along the length (i.e., along the longitudinal axis 112) of the tray table 100 at any position past which it is desired to limit travel of the carriage 138 toward the stowed position when the table leaf 104 is deployed. For example, in some implementations, the stop 174 is positioned along the length of the tray table 100 at a position that limits movement of the tray table 100 toward the stowed position past the partially-extended position of the tray table 100 and/or past an egress position of the tray table 100 when the table leaf 104 is in the deployed position.

By limiting movement of the tray table 100 toward the stowed position, the interlock assembly 110 prevents, or reduces the likelihood of, the table leaf 104 contacting (e.g., clashing with, etc.) adjacent structures of the aircraft in the event a user attempts to push the tray table 100 toward the stowed position of the tray table 100 when the table leaf 104 is in the deployed position of the table leaf 104. The interlock assembly 106 therefore facilitates preventing damage to the tray table 100 and/or structures of the aircraft that are adjacent the tray table 100.

Although the exemplary implementation of the interlock assembly 110 is shown and described herein as operating using a repulsive force between the magnetic components 184 and 186, in some implementations the interlock assembly 110 may hold the interlock 162 in the unlocked position using an attractive force between the magnetic components 184 and 186 (e.g., using a fulcrum 168 positioned along the actuating end portion 170 of the lever 164, etc.). Moreover, in some implementations the lever 164 moves linearly between the unlocked and locked positions of the interlock 162 in addition or alternative to the pivoting motion of the exemplary implementation. Although shown herein as having an arm or finger structure, the stop 174 may additionally or alternatively include any other structure (e.g., a pin structure, etc.) that enables the stop 174 to function as described and/or illustrated herein.

Figure 11:
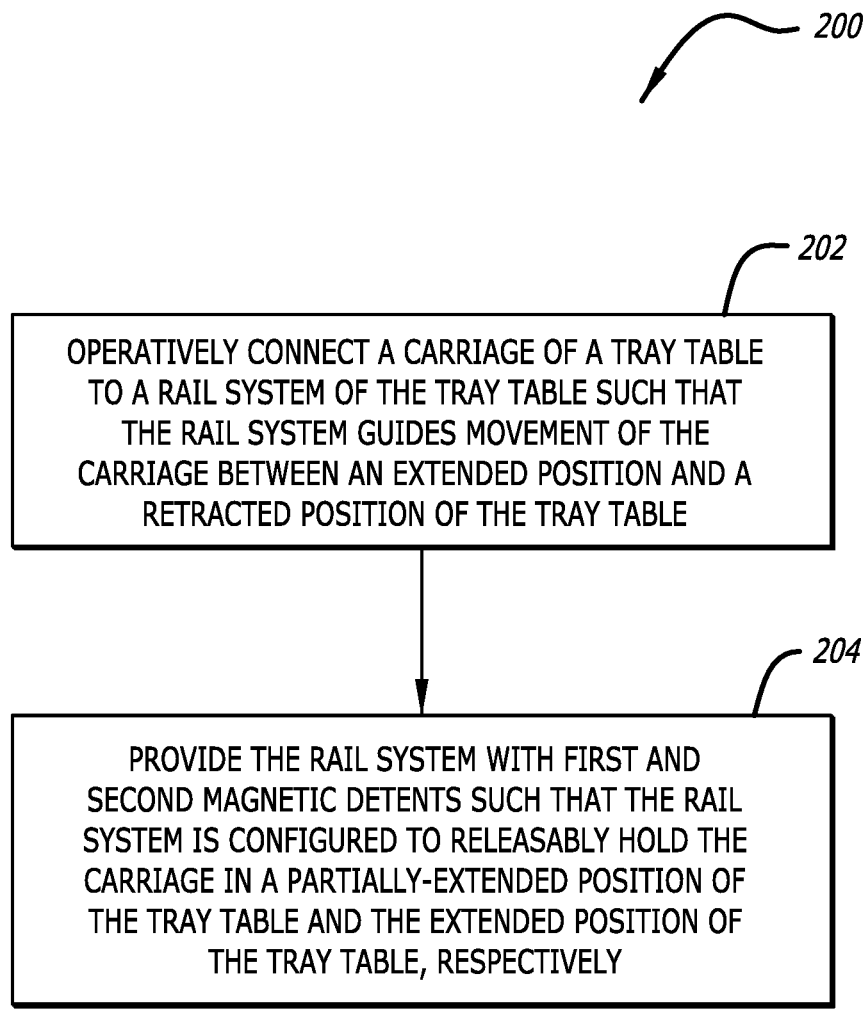
FIG. 11 illustrates a flow chart illustrating a method of configuring a tray table for an aircraft according to an implementation.

FIG. 11 illustrates a method 200 of configuring a tray table (e.g., the tray table 100 shown in FIGS. 1-10, etc.) for an aircraft (e.g., the aircraft 400 shown in FIG. 13, etc.) according to an implementation. The method 200 includes operatively connecting, at 202, a carriage of the tray table to a rail system of the tray table such that the rail system guides movement of the carriage between an extended position and a retracted position of the tray table. At 204, the method 200 includes providing the rail system with first and second magnetic detents such that the rail system is configured to releasably hold the carriage in a partially-extended position of the tray table and the extended position of the tray table, respectively.

Figure 12:
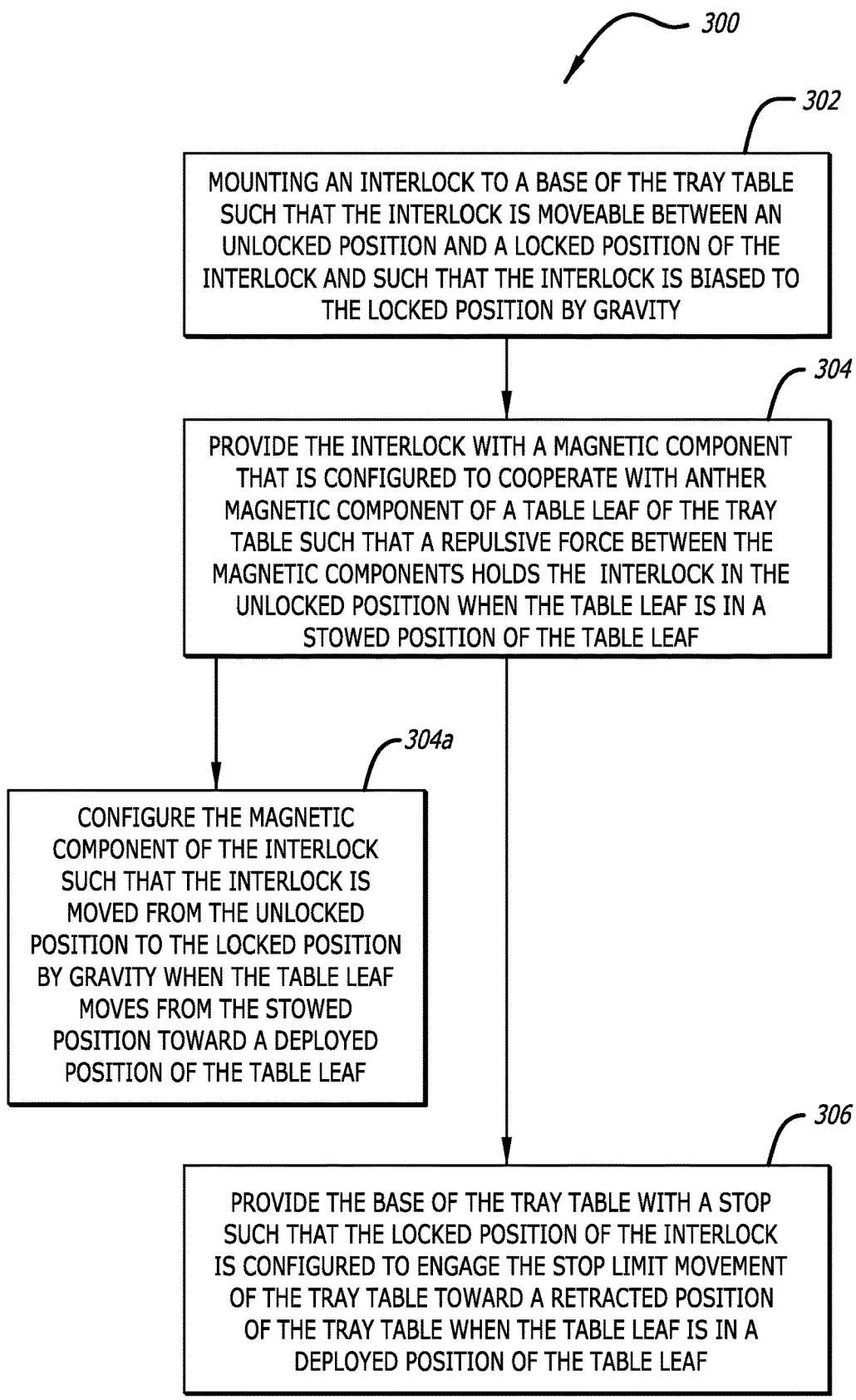
FIG. 12 illustrates a flow chart illustrating a method of configuring a tray table for an aircraft according to another implementation.

FIG. 12 illustrates a method 300 of configuring a tray table (e.g., the tray table 100 shown in FIGS. 1-10, etc.) for an aircraft (e.g., the aircraft 400 shown in FIG. 13, etc.) according to an implementation. The method 300 includes mounting, at 302, an interlock to a base of the tray table such that the interlock is moveable between an unlocked position and a locked position of the interlock and such that the interlock is biased to the locked position by gravity and assisted by a spring. At 304, the method 300 includes providing the interlock with a magnetic component that is configured to cooperate with another magnetic component of a table leaf of the tray table such that a repulsive force between the magnetic components holds the interlock in the unlocked position when the table leaf is in a stowed position of the table leaf.

In some implementations, the method 300 further includes providing, at 306, the base of the tray table with a stop such that the locked position of the interlock is configured to engage the stop to limit movement of the tray table toward a retracted position of the tray table when the table leaf is in a deployed position of the table leaf.

Optionally, providing at 304 the interlock includes configuring, at 304*a*, the magnetic component of the interlock such that the interlock is moved from the unlocked position to the locked position by gravity when the table leaf moves from the stowed position toward a deployed position of the table leaf.

Figure 13:
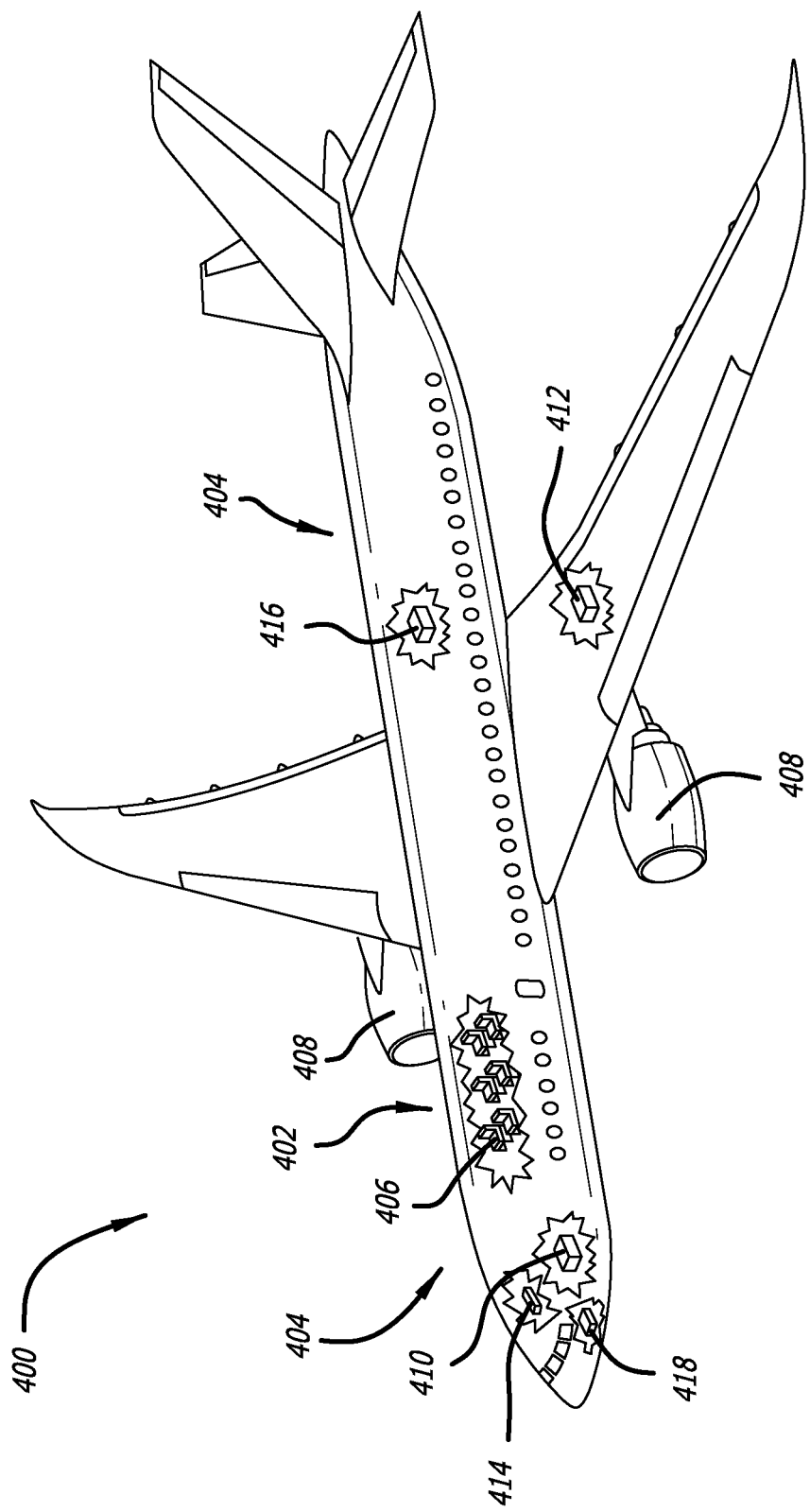
FIG. 13 illustrates a schematic view of an implementation of an aircraft.

Referring now to FIG. 13, examples of the present application may be described in the context of using the tray tables disclosed herein on an aircraft 400 that includes an airframe 402. The aircraft 400 includes a plurality of high-level systems 404 and an interior 406. Examples of high-level systems 404 include one or more of a propulsion system 408, an electrical system 410, a hydraulic fluid system 412, a control system 414, and an environmental system 416. Any number of other systems can be included. Although a fixed wing passenger aircraft is shown, the tray tables described and/or illustrated herein can be used with any other type of aircraft, such as, but not limited to, transport aircraft, military aircraft, rotorcraft (e.g., helicopters, etc.), lighter than air vehicles (e.g., balloons, etc.), and/or the like. Moreover, although an aerospace example is shown, the present application can be applied to other industries, such as, but not limited to, the automotive industry, the marine industry, etc.

Although the present invention has been discussed above in connection with use on a passenger aircraft, the present invention is not limited to that environment and may also be used on passenger trains, cars, buses and other vehicles including, but not limited to, carts, carriages, and means of transportation mounted on rails.

Likewise, the present invention is also not to be limited to use in vehicles and may be used in non-vehicle or stationary environments where there is seating, and it is desirable to stow and deploy a flat work surface for use in the types of activities that the flat surfaces of tables, desks, countertops or the like are typically used for. Furthermore, the present invention is also not to be limited to use in connection with seating, and may be used in any environment where the device may be stowed within and deployed from a recess formed in a surface (e.g., a wall, a desktop, a table), or attached to a flat surface (e.g., a wall, a desktop, a table) that does not have a recess into which the device may be stowed.

In addition, the claimed invention is not limited in size and may be constructed in miniature versions or for use in very large-scale applications in which the same or similar principles of motion and friction control as described above would apply. Likewise, the length and width of the table surface areas provided by the table assemblies are not to be construed as drawn to scale, and that the lengths/widths of the table surface areas may be adjusted in conformance with the area available for stowage/deployment of the table assemblies. Furthermore, the figures (and various components shown therein) of the specification are not to be construed as drawn to scale.

The following clauses describe further aspects:

Clause Set A:

A1. A telescopic rail system for a tray table of an aircraft, the rail system comprising:
rails and rail mounts slidably interconnected with each other such that the rails and rail mounts slide relative to each other along a longitudinal axis, the rails being configured to be operatively connected to the carriage such that the rails and rail mounts guide movement of the carriage between an extended position and a retracted position of the tray table, wherein the rails and rails mounts comprise first and second magnetic detents configured to releasably hold the carriage in a partially-extended position of the tray table and the extended position of the tray table, respectively.

A2. The rail system of any preceding clause, wherein the rails and rail mounts comprise first and second rails comprising respective first and second magnetic components of the first magnetic detent.

A3. The rail system of any preceding clause, wherein the rails comprise a first rail configured to be slidably interconnected with the carriage, the first rail and the carriage comprising respective third and fourth magnetic components of the second magnetic detent.

A4. The rail system of any preceding clause, wherein the first magnetic detent comprises first and second magnetic components of respective first and second rails of the rails, the first and second magnetic components being configured to releasably hold the carriage in the partially-extended position of the tray table when the first and second magnetic components are at least partially aligned with each other along the longitudinal axis.

A5. The rail system of any preceding clause, wherein the second magnetic detent comprises third and fourth magnetic components of a first rail of the rails and the carriage, respectively, the third and fourth magnetic components being configured to releasably hold the carriage in the extended position of the tray table when the third and fourth magnetic components are at least partially aligned with each other along the longitudinal axis.

A6. The rail system of any preceding clause, wherein the rails are slidably interconnected with each other a slide block that enable the rails to slide relative to each other.

A7. The rail system of any preceding clause, wherein the rails comprise first and second rails, first rail comprising a first magnetic component of the first magnetic detent, the second rail comprising a slide block that slidably interconnects the second rail to the first rail, the slide block comprising a second magnetic component of the first magnetic detent.

A8. The rail system of any preceding clause, wherein the first magnetic detent is configured to generate an audible indication when the carriage moves into the partially-extended position.

A9. The rail system of any preceding clause, wherein the first magnetic detent is configured to generate a tactile indication when the carriage moves into the partially-extended position.

A10. The rail system of any preceding clause, wherein the second magnetic detent is configured to generate an audible indication when the carriage moves into the extended position.

A11. The rail system of any preceding clause, wherein the second magnetic detent is configured to generate a tactile indication when the carriage moves into the extended position.

A12. The rail system of any preceding clause, wherein the rails comprise rail sets.

Clause set B:

B1. A slide-out tray table of an aircraft, the comprising:
a carriage configured to hold a table leaf of the tray table; and
a telescopic rail system configured to expand outwardly and retract inwardly along a longitudinal axis, the rail system being operatively connected to the carriage such that the rail system guides movement of the carriage between an extended position and a retracted position of the tray table, wherein the rail system comprises:
a first magnetic detent configured to releasably hold the carriage in a partially-extended position of the tray table; and
a second magnetic detent configured to releasably hold the carriage in the extended position of the tray table.

B2. The tray table of any preceding clause, wherein the rail system comprises first and second rails that are slidably interconnected with each other, the first and second rails comprising respective first and second magnetic components of the first magnetic detent.

B3. The tray table of any preceding clause, wherein the rail system comprises a rail slidably interconnected with the carriage, the rail and the carriage comprising respective third and fourth magnetic components of the second magnetic detent.

B4. The tray table of any preceding clause, wherein the first magnetic detent comprises first and second magnetic components of respective first and second rails of the rail system, the first and second magnetic components being configured to releasably hold the carriage in the partially-extended position of the tray table when the first and second magnetic components are at least partially aligned with each other along the longitudinal axis.

B5. The tray table of any preceding clause, wherein the second magnetic detent comprises third and fourth magnetic components respectively of a rail of the rail system and the carriage, the third and fourth magnetic components being configured to releasably hold the carriage in the extended position of the tray table when the third and fourth magnetic components are at least partially aligned with each other along the longitudinal axis.

B6. The tray table of any preceding clause, wherein the rail system comprises rails that are slidably interconnected with each other and the carriage via slide blocks that enable the rails to slide relative to each other and the carriage.

B7. The tray table of any preceding clause, wherein the rail system comprises first and second rails, the second rail comprising a slide block that slidably interconnects the second rail to the first rail, the slide block comprising a second magnetic component of the first magnetic detent.

B8. The tray table of any preceding clause, wherein the carriage comprises a slide block that slidably interconnects the carriage with the rail system, the slide block comprising a fourth magnetic component of the second magnetic detent.

B9. The tray table of any preceding clause, wherein the first magnetic detent is configured to generate an audible indication when the carriage moves into the partially-extended position.

B10. The tray table of any preceding clause, wherein the first magnetic detent is configured to generate a tactile indication when the carriage moves into the partially-extended position.

B11. The tray table of any preceding clause, wherein the second magnetic detent is configured to generate an audible indication when the carriage moves into the extended position.

B12. The tray table of any preceding clause, wherein the second magnetic detent is configured to generate a tactile indication when the carriage moves into the extended position.

B13. The tray table of any preceding clause, wherein the rail system comprises rail sets that are slidably interconnected with each other such that the rail sets slide relative to each other along the longitudinal axis to thereby guide movement of the carriage between the extended and retracted positions of the tray table.

Clause set C:

C1. A method of configuring a tray table for an aircraft, the method comprising:
operatively connecting a carriage of the tray table to a rail system of the tray table such that the rail system guides movement of the carriage between an extended position and a retracted position of the tray table; and
providing the rail system with first and second magnetic detents such that the rail system is configured to releasably hold the carriage in a partially-extended position of the tray table and the extended position of the tray table, respectively.

Clause set D:

D1. An interlock assembly for a tray table of an aircraft, the interlock assembly comprising:
an interlock moveable between an unlocked position and a locked position, the interlock being configured to be held by the tray table such that the interlock is biased to the locked position by gravity, the interlock comprising a magnetic component that cooperates with another magnetic component of a table leaf of the tray table such that a repulsive force between the magnetic components holds the interlock in the unlocked position when the table leaf is in a stowed position of the table leaf, wherein the interlock is configured such that the interlock is moved from the unlocked position to the locked position by gravity when the table leaf moves from the stowed position toward a deployed position of the table leaf.

D2. The interlock assembly of any preceding clause, wherein the locked position of the interlock is configured to engage a stop of the tray table to limit movement of the tray table toward a retracted position of the tray table when the table leaf is in the deployed position.

D3. The interlock assembly of any preceding clause, wherein the magnetic component of the interlock is configured such that the interlock is moved from the unlocked position to the locked position by gravity when the table leaf unfolds from the stowed position toward the deployed position of the table leaf.

D4. The interlock assembly of any preceding clause, wherein the interlock comprises a lever configured to be held by the tray table such that the lever pivots between the locked and unlocked positions of the interlock.

D5. The interlock assembly of claim of any preceding clause, wherein the interlock comprises a lever that pivots about a fulcrum between the locked and unlocked positions of the interlock, the lever extending from an actuating end portion that comprises the magnetic component to a stopping end portion that is configured to engage a stop of the tray table.

D6. The interlock assembly of any preceding clause, wherein the locked position of the interlock is configured to engage a stop of the tray table to limit movement of the tray table past an egress position of the tray table when the table leaf is in the deployed position.

D7. The interlock assembly of any preceding clause, wherein an end portion of the interlock rotates between the unlocked and locked positions.

Clause set E:

E1. A slide-out tray table for an aircraft, the tray table comprising:
a telescoping base configured to expand outwardly and retract inwardly between an extended position and a retracted position of the tray table;
a table leaf mounted to the base such that the table leaf moves along with the base between the extended and retracted positions of the tray table, the table leaf being selectively moveable between a stowed position and a deployed position, the table leaf comprising a first magnetic component; and
an interlock assembly comprising:
an interlock moveable between an unlocked position and a locked position, the interlock being held by the base such that the interlock is biased to the locked position by gravity, the interlock comprising a second magnetic component that cooperates with the first magnetic component of the table leaf such that a repulsive force between the first and second magnetic components holds the interlock in the unlocked position when the table leaf is in the stowed position.

E2. The tray table of any preceding clause, wherein the interlock is configured such that the interlock is moved from the unlocked position to the locked position by gravity and spring when the table leaf moves from the stowed position toward the deployed position of the table leaf.

E3. The tray table of any preceding clause, wherein the base of the tray table comprises a stop, the locked position of the interlock being configured to engage the stop to limit movement of the tray table toward the retracted position of the tray table when the table leaf is in the deployed position.

E4. The tray table of any preceding clause, wherein the first and second magnetic components are configured such that the interlock moves from the unlocked position to the locked position by gravity and spring when the table leaf unfolds from the stowed position toward the deployed position of the table leaf.

E5. The tray table of any preceding clause, wherein the interlock comprises a lever held by the tray table such that the lever pivots between the locked and unlocked positions of the interlock.

E6. The tray table of any preceding clause, wherein the base of the tray table comprises a stop, the interlock comprising a lever that pivots about a fulcrum between the locked and unlocked positions of the interlock, the lever extending from an actuating end portion that comprises the magnetic component to a stopping end portion that is configured to engage the stop.

E7. The tray table of any preceding clause, wherein the base of the tray table comprises a stop, the locked position of the interlock being configured to engage a stop of the tray table to limit movement of the tray table past an egress position of the tray table when the table leaf is in the deployed position.

E8. The tray table of any preceding clause, wherein the base comprises a rail and a stop arm extending outward from the rail toward the interlock, wherein, when the interlock is in the locked position, the stop is configured to engage the interlock as the tray table is moved toward the retracted position.

E9. The tray table of any preceding clause, wherein the first magnetic component is embedded within the table leaf.

E10. The tray table of any preceding clause, wherein an end portion of the interlock rotates between the unlocked and locked positions.

Clause set F:

F1. A method of configuring a tray table for an aircraft, the method comprising:
mounting an interlock to a base of the tray table such that the interlock is moveable between an unlocked position and a locked position of the interlock and such that the interlock is biased to the locked position by gravity and spring; and
providing the interlock with a magnetic component that is configured to cooperate with another magnetic component of a table leaf of the tray table such that a repulsive force between the magnetic components holds the interlock in the unlocked position when the table leaf is in a stowed position of the table leaf.

F2. The method of any preceding clause, wherein providing the interlock comprises configuring the magnetic component of the interlock such that the interlock is moved from the unlocked position to the locked position by gravity and spring when the table leaf moves from the stowed position toward a deployed position of the table leaf.

F3. The method of any preceding clause, further comprising providing the base of the tray table with a stop such that the locked position of the interlock is configured to engage the stop to limit movement of the tray table toward a retracted position of the tray table when the table leaf is in a deployed position of the table leaf.

Clause set G:

G1. An interlock assembly for a tray table of an aircraft, the interlock assembly comprising:
an interlock moveable between an unlocked position and a locked position, the interlock being configured to be held by the tray table such that the interlock is biased to the locked position by gravity and spring, the interlock comprising a magnetic component that cooperates with another magnetic component of a table leaf of the tray table such that the magnetic components hold the interlock in the unlocked position when the table leaf is in a stowed position of the table leaf, wherein the interlock is configured such that the interlock is moved from the unlocked position to the locked position by gravity and spring when the table leaf moves from the stowed position toward a deployed position of the table leaf.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The order of execution or performance of the operations in examples of the present application illustrated and described herein is not essential, unless otherwise specified. That is, the operations can be performed in any order, unless otherwise specified, and examples of the application can include additional or fewer operations than those disclosed herein. For example, it is contemplated that executing or performing a particular operation before, contemporaneously with, or after another operation (e.g., different steps, etc.) is within the scope of aspects and implementations of the application.

The term "comprising" is used in this specification to mean including the feature(s) or act(s) followed thereafter, without excluding the presence of one or more additional features or acts. The terms "comprising," "including," and "having" are intended to be inclusive and mean that there can be additional elements other than the listed elements. In other words, the use of "including," "comprising," "having," "containing," "involving," and variations thereof, is meant to encompass the items listed thereafter and additional items. Further, references to "one embodiment" or "one implementation" are not intended to be interpreted as excluding the existence of additional embodiments or implementations that also incorporate the recited features. The term "exemplary" is intended to mean "an example of".

When introducing elements of aspects of the application or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one."

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the application in detail, it will be apparent that modifications and variations are possible without departing from the scope of aspects of the application as defined in the appended claims. As various changes could be made in the above constructions, products, and methods without departing from the scope of aspects of the application, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the application without departing from their scope. While the dimensions and types of materials described herein are intended to define the parameters of the various embodiments of the application, the embodiments are by no means limiting and are example embodiments. Many other embodiments will be apparent to those of ordinary skill in the art upon reviewing the above description. The scope of the various embodiments of the application should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the application, including the best mode, and also to enable any person of ordinary skill in the art to practice the various embodiments of the application, including making and using any devices or systems and performing any incorporated methods. The patentable scope of the various embodiments of the application is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A telescopic rail system, the rail system comprising: rails slidably interconnected with each other such that the rails slide relative to each other along a longitudinal axis, the rails being configured to be operatively connected to a carriage such that the rails guide movement of the carriage between an extended position and a retracted position, wherein the rails comprise first and second magnetic detents configured to releasably hold the carriage in a partially-extended position and the extended position, respectively.

2. The rail system of claim 1, wherein the rails comprise first and second rails comprising respective first and second magnetic components of the first magnetic detent.

3. The rail system of claim 1, wherein the rails comprise a first rail configured to be slidably interconnected with the carriage, the first rail and the carriage comprising respective third and fourth magnetic components of the second magnetic detent.

4. The rail system of claim 1, wherein the first magnetic detent comprises first and second magnetic components of respective first and second rails of the rails, the first and second magnetic components being configured to releasably hold the carriage in the partially-extended position when the first and second magnetic components are at least partially aligned with each other along the longitudinal axis.

5. The rail system of claim 1, wherein the second magnetic detent comprises third and fourth magnetic components of a first rail of the rails and the carriage, respectively, the third and fourth magnetic components being configured to releasably hold the carriage in the extended position when the third and fourth magnetic components are at least partially aligned with each other along the longitudinal axis.

6. The rail system of claim 1, wherein the rails are slidably interconnected with each other using a slide block that enables the rails to slide relative to each other.

7. The rail system of claim 1, wherein the rails comprise first and second rails, first rail comprising a first magnetic component of the first magnetic detent, the second rail comprising a slide block that slidably interconnects the second rail to the first rail, the slide block comprising a second magnetic component of the first magnetic detent.

8. The rail system of claim 1, wherein the first magnetic detent is configured to generate an audible indication when the carriage moves into the partially-extended position.

9. The rail system of claim 1, wherein the first magnetic detent is configured to generate a tactile indication when the carriage moves into the partially-extended position.

10. The rail system of claim 1, wherein the second magnetic detent is configured to generate an audible indication when the carriage moves into the extended position.

11. The rail system of claim 1, wherein the second magnetic detent is configured to generate a tactile indication when the carriage moves into the extended position.

12. The rail system of claim 1, wherein the rails comprise rail sets.

13. An interlock assembly for a tray table of an aircraft, the interlock assembly comprising:
an interlock moveable between an unlocked position and a locked position, the interlock being configured to be held by the tray table such that the interlock is biased to the locked position by gravity, the interlock comprising a magnetic component that cooperates with another magnetic component of a table leaf of the tray table such that a repulsive force between the magnetic components holds the interlock in the unlocked position when the table leaf is in a stowed position of the table leaf, wherein the interlock is configured such that the interlock is moved from the unlocked position to the locked position by gravity when the table leaf moves from the stowed position toward a deployed position of the table leaf.

14. The interlock assembly of claim 13, wherein the locked position of the interlock is configured to engage a stop of the tray table to limit movement of the tray table toward a retracted position of the tray table when the table leaf is in the deployed position.

15. The interlock assembly of claim 13, wherein the magnetic component of the interlock is configured such that the interlock is moved from the unlocked position to the locked position by gravity when the table leaf unfolds from the stowed position toward the deployed position of the table leaf.

16. The interlock assembly of claim 13, wherein the interlock comprises a lever configured to be held by the tray table such that the lever pivots between the locked and unlocked positions of the interlock.

17. The interlock assembly of claim 13, wherein the interlock comprises a lever that pivots about a fulcrum between the locked and unlocked positions of the interlock, the lever extending from an actuating end portion that comprises the magnetic component to a stopping end portion that is configured to engage a stop of the tray table.

18. The interlock assembly of claim 13, wherein the locked position of the interlock is configured to engage a stop of the tray table to limit movement of the tray table past an egress position of the tray table when the table leaf is in the deployed position.

19. The interlock assembly of claim 13, wherein an end portion of the interlock rotates between the unlocked and locked positions.

20. An interlock assembly for a tray table of an aircraft, the interlock assembly comprising:
an interlock moveable between an unlocked position and a locked position, the interlock being configured to be held by the tray table such that the interlock is biased to the locked position by gravity, the interlock comprising a magnetic component that cooperates with another magnetic component of a table leaf of the tray table such that the magnetic components hold the interlock in the unlocked position when the table leaf is in a stowed position of the table leaf, wherein the interlock is configured such that the interlock is moved from the unlocked position to the locked position by gravity when the table leaf moves from the stowed position toward a deployed position of the table leaf.

* * * * *